(12) United States Patent
Ohshima et al.

(10) Patent No.: US 6,414,681 B1
(45) Date of Patent: *Jul. 2, 2002

(54) METHOD AND APPARATUS FOR STEREO IMAGE DISPLAY

(75) Inventors: Toshikazu Ohshima, Kawasaki; Hideyuki Tamura, Yokohama; Hiroyuki Yamamoto, Chigasaki; Shinji Uchiyama, Yokohama, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/529,460

(22) Filed: Sep. 18, 1995

(30) Foreign Application Priority Data

Oct. 12, 1994 (JP) .............................................. 6-246254

(51) Int. Cl.$^7$ ............................................... G06T 15/00
(52) U.S. Cl. ...................................................... 345/428
(58) Field of Search ........................ 395/128, 119–121, 395/123, 126, 127, 129, 133; 345/428, 419–421, 423, 426, 427, 429, 433

(56) References Cited

U.S. PATENT DOCUMENTS

| | | |
|---|---|---|
| 4,418,993 A | 12/1983 | Lipton .......................... 352/57 |
| 5,383,013 A | 1/1995 | Cox ................................ 356/2 |
| 5,446,834 A * | 8/1995 | Deering ....................... 395/127 |
| 5,459,605 A | 10/1995 | Kempf ......................... 359/462 |
| 5,510,831 A | 4/1996 | Mayhew ....................... 348/47 |

OTHER PUBLICATIONS

Foley Et Al. "Computer Graphics Principles and Practice" pp xvii–xxiii (Contents) (1990).*

Allebach Et Al. "Human Vision, Visual Processing, and Digital Display" pp 622–636, Feb. 1993.*

* cited by examiner

*Primary Examiner*—Almis R. Jankus
(74) *Attorney, Agent, or Firm*—Morgan & Finnegan, LLP

(57) ABSTRACT

Whether or not an object to be rendered in stereo images is inside of a fusional area is determined on the basis of a focus point and positions of eyes of a viewer. By using characteristics of a view sight of a human in which an object in a fusional area of human eyes can be clearly recognized as a single solid, however, if an object is not in the fusional area, the object is recognized as vague overlapped images, an object which is inside of the fusional area is rendered by using an image generating algorithm capable expressing in high precision. In contrast, an object which is outside of the fusional area is rendered by using an image generating algorithm which requires lighter calculation load than the former image generating algorithm.

48 Claims, 18 Drawing Sheets

FIG. 6

| IDENTIFICATION NUMBER | TYPE | GEOMETRICAL DATA |
|---|---|---|
| 1 | TRIANGLE | COORDINATES OF VERTEXES, CONNECTION RELATIONSHIP, COLOR, ETC. |
| 2 | CHARACTER STRING | FONT DATA, COORDINATES, CHARACTER SIZE, ETC. |
| 3 | SPHERE | RADIUS, COORDINATES, COLOR, TEXTURE, ETC. |
| 4 | CURVED SURFACE | CONTROL POINTS, COLOR, TEXTURE, ETC. |
| ... | | |

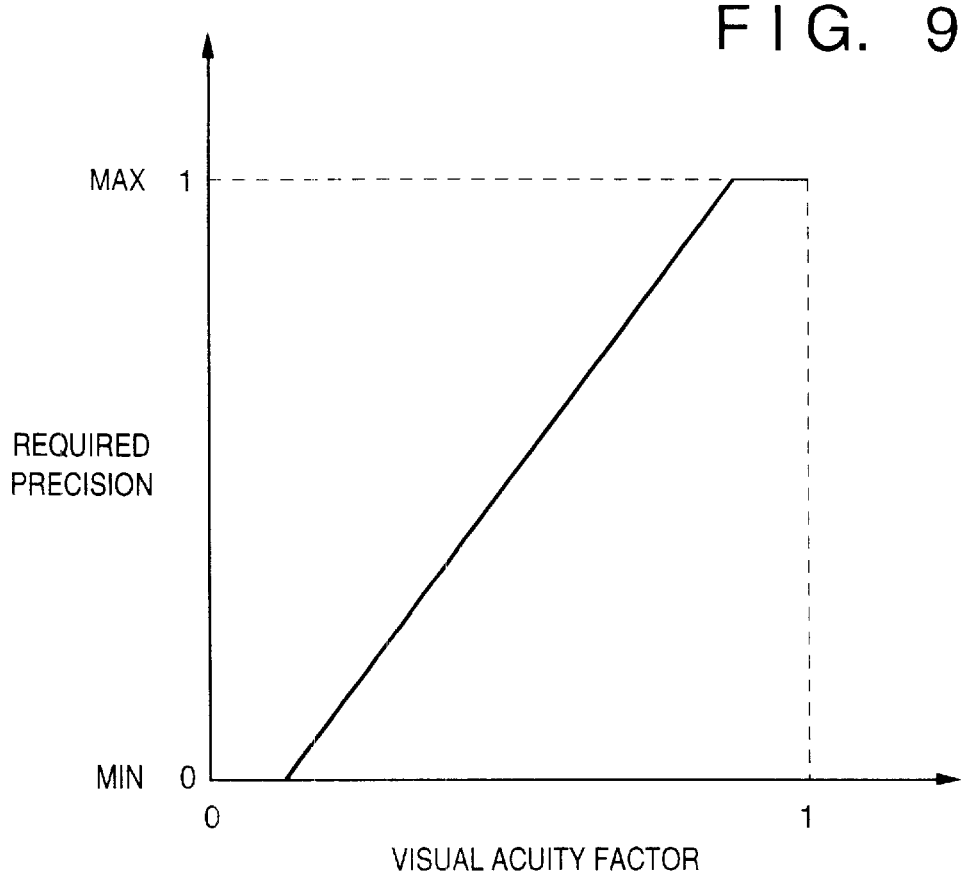

METHOD AND APPARATUS FOR STEREO IMAGE DISPLAY

BACKGROUND OF THE INVENTION

The present invention relates to a stereo image generating and displaying method and apparatus and, more particularly, to a stereo image generating and displaying method and apparatus which interpret geometrical figure data showing font types, plane figures, solid shapes, and so on, and attributes data representing color and texture, for example, and environmental data, such as data of illuminating light and projection, calculate and generate a few to several frames of new stereo images in a second, and modify displayed stereo images as soon as new stereo images are generated, capable of processing at real time.

Conventionally, no matter where on a display screen a viewer is watching, a stereo image generating and displaying apparatus of a real-time processing type for displaying a moving picture generates an entire image to be displayed on the display screen by using a single image generating algorithm.

Generally, in a stereo image generating and displaying apparatus of real-time processing type, speed to generate images to be displayed on a display screen has priority over quality of the images. In order to process images at real time, it is necessary to decrease processing load on the apparatus by simplifying an image generating algorithm, for instance.

However, when conventional method for simplifying an image generating algorithm is used, quality of entire images uniformly decreases, which makes a viewer clearly notice a drop of image quality.

To avoid the aforesaid problem, it has been necessary to use an expensive high speed computer which is exclusively used for image generation in order to generate images of moderate quality at real time. Even though an expensive high speed computer is used, there are many cases where satisfactory image quality cannot be achieved.

When a viewer watches an object with both right and left eyes, the eyes move so as to focus corresponding points in an image seen by the right eye and in an image seen by the left eye. This eye movement is called "convergence eye-movement". Accordingly, the viewer perceives the object as a single solid image.

In contrast, other objects which are placed in either closer or farther positions than a focusing position of right and left eyes, e.g., an object B shown in FIG. 23, are seen as vague overlapped images, since binocular parallaxes to these objects are different from that to the object at the focusing position.

We daily experience this phenomenon although we do not usually conceive the phenomenon. In geometrical explanation, binocular parallaxes to points which are on a circumference (Vieth-Muller's holopter) that passes through positions of right and left eyes and a focus point of the eyes are same, as shown in FIG. 24. Therefore, images of an object, seen by right and left eyes, on the circumference look focused, thus perceived as a single image. Actually, there are some allowance area for human eyes to see an object as a unified single, image, and the area is called "Panum's fusional area" (Toyohiko Hatada, "Psychology to See a Stereoscopic Image", Vol. 20, No. 1, pp. 27–38, 1988).

SUMMARY OF THE INVENTION

The present invention has been made in consideration of the above situation, and has as its object to generate and display stereo images of better quality while keeping image processing speed by reducing calculation load for generating each stereo image.

According to the present invention, the foregoing object is attained by providing a method for generating stereo images from figure data of objects, the method comprising: a first determination step of determining whether or not an object to be rendered in the stereo images is in a specific area which is determined by eye characteristics, on the basis of a focus point and line-of-sight directions of right and left eyes; and a generating step of generating stereo images based on the figure in a first image generating method when the object to be rendered in the stereo images is inside of the specific area, and in a second image generating method when the object to be rendered in the stereo images is outside of the specific area.

With the aforesaid method, an image can be processed by using different kinds of image generating algorithms and parameters for a fusional area which is decided by characteristics of the eyes and for other areas. Therefore, it is possible to generate stereo images of better quality while keeping image processing speed by reducing calculation load for generating each stereo image.

It is another object of the present invention to provide a method for generating stereo images from figure data of objects and displaying the generated stereo images, the method comprising: an operation step of obtaining a visual acuity factor of right and left eyes of a viewer for the figure data of each object on the basis of focus point and line-of-sight directions of the right and left eyes of the viewer; a generating step of generating stereo images of first and second objects by applying different image generating methods to the first and second objects whose visual acuity factor, obtained at the operation step, is different from each other; and a displaying step of displaying the stereo images generated at the generating step.

Still another object of the present invention is to provide a method for generating stereo images from figure data of objects and displaying the generated stereo images, the method comprising: an operation step of obtaining a visual acuity factor of right and left eyes of a viewer for the figure data of each object on the basis of focus point and line-of-sight directions of the right and left eyes of the viewer; a determination step of determining a required precision for each object to be rendered in stereo images on the basis of the visual acuity factor obtained at the operation step; a generating step of generating stereo images of the objects by changing parameters for an image generating method to be applied to figure data of each object on the basis of the required precision determined at the determining step; and a displaying step of displaying the stereo images generated at the generating step.

According to the aforesaid methods, resolution of each of plurality of parts which consist the stereo images can be flexibly adjusted in accordance with a visual acuity factor. More specifically, it is possible to choose parameters to be used in an image generating method selected in accordance with the visual acuity factor, thus calculation load for generating each stereo image is reduced and stereo images of better quality can be generated and displayed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is an example of a figure data table according to the first embodiment;

FIG. 9 is a graph showing relationship between a visual acuity factor and required precision according to the first embodiment;

FIG. 10 is a table showing selections for processing figure data on the basis of required precision according to the first embodiment;

DETAILED DESCRIPTION OF THE PREFERRED EMBODIMENTS

Preferred embodiments of the present invention will be described in detail in accordance with the accompanying drawings.

<First Embodiment>

An image displaying method and apparatus of the first embodiment will be described with reference to the drawings.

In the stereo image generating and displaying apparatus capable of processing at real time of the first embodiment, a position and posture of the head of a viewer are detected by a position and posture detector which the viewer wears on the head, and lines of sight of both right and left eyes of the viewer are determined by two eye-movement detectors which are provided near the right and left eyes. The determined information is inputted into an operation unit of the apparatus.

Then, a focus point and lines of sight of the right and left eyes with respect to a stereo image display screen are calculated from the inputted information. Further, geometrical information of the calculated focus point is changed so as to be expressed in a three dimensional coordinate system which defines figures to be expressed.

Next, the angle made between the lines of sight of the right and left eyes is calculated, and the angle is called as a convergence angle. Further, the angle made between lines from a representative point of a unit figure to be displayed in the three dimensional coordinate to the right and left eyes is obtained. Then, absolute value of a difference between the convergence angle and the obtained latter angle is calculated.

A visual acuity factor, which falls as the absolute value of the difference increases is determined for each unit figure (area to be processed in each processing cycle), and depending upon the determined value, an image generating algorithm and parameters for the unit figure used to generate a stereo image are selected.

It should be noted that, in selection of the image generation algorithm and determination of its parameters, they are selected so that an image of a unit figure which is in an area requiring a high visual acuity factor is generated in high quality whereas an image of a unit figure which is in an area requiring a low visual acuity factor is generated by using simpler algorithm than the algorithm used for generating the above high quality image so as to reduce calculation load. Accordingly, with keeping quality of parts of stereo images which the viewer recognizes high, overall calculation load for generating the stereo images can be greatly reduced.

Stereo images for right and left eyes consisting of unit figures are generated by using the selected image generating algorithms and parameters, and the stereo images are displayed on the screen. Further, a cross-shaped cursor is rendered over each of the stereo images for right and left eyes at the focus point.

Figure 1:
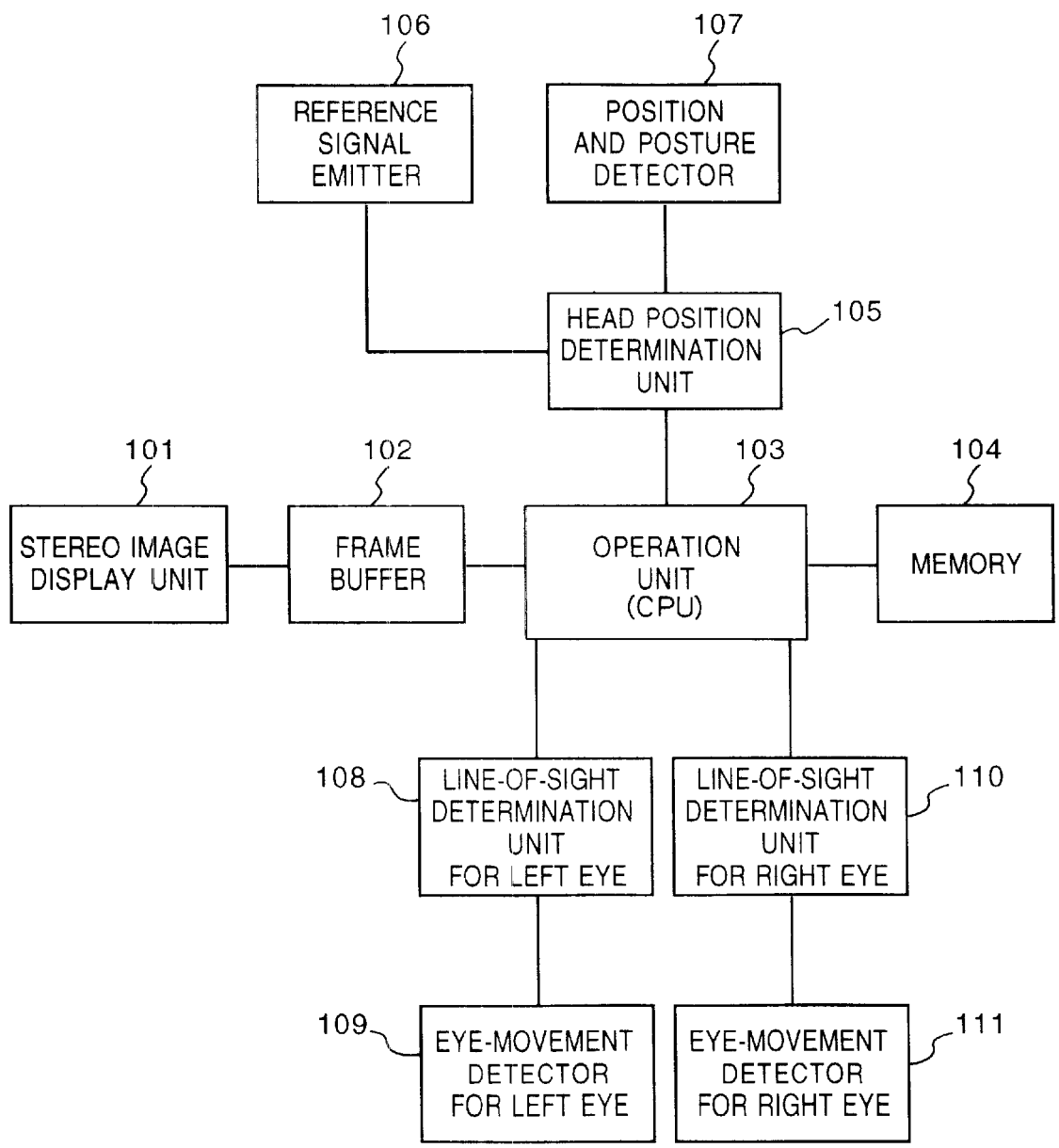
FIG. 1 is a block diagram showing a basic configuration of a stereo image generating and displaying apparatus according to a first embodiment of the present invention.

An operation of the stereo image generating and displaying apparatus of the first embodiment will be explained. FIG. 1 is a block diagram showing a basic configuration of a stereo image generating and displaying apparatus capable of real-time image processing according to the first embodiment.

In FIG. 1, reference 101 denotes a stereo image displaying unit for displaying images to a viewer, and is constructed with a CRT display or an LCD display and the like having stereo image display function. A stereo image display function can be realized by a lenticular method, a time-division method using circular polarized light, a time-division method using a liquid crystal shutter, and so on.

Reference numeral 102 denotes a frame buffer and it stores image data to be displayed by the stereo image display unit 101. Reference numeral 103 denotes an operation unit for performing processes by following a processing sequence which is stored in a memory 104, and it generates image data as well as controls each unit. The image data generated by the operation unit 103 is stored in the frame buffer 102.

The memory 104 is for storing a processing sequence and necessary information for the processing which is performed by the operation unit 103. It also provides working area for calculation performed by the operation unit 103. More precisely, the memory 104 stores a control program expressed by a flowchart which will be described later with reference to FIG. 4, data relating a figure to be rendered, and data necessary for the processing.

Further, reference numeral 105 denotes a head position determination unit which analyzes signals from a position and posture detector 107, and inputs position and posture information of the viewer's head with respect to a reference signal emitter 106 to the operation unit 103.

The reference signal emitter 106 is for generating a signal for notifying a reference point to the position and posture detector 107. The position and posture detector 107 is for detecting a position and posture of head.

Reference numeral 108 denotes a line-of-sight direction determination unit for left eye (referred as "left line-of-sight direction determination unit", hereinafter) and it analyzes signals from an eye-movement detector for left eye 109, and inputs line-of-sight information of left eye with respect to the head position to the operation unit 103. The eye-movement detector for left eye 109 (referred as "left eye-movement detector", hereinafter) is for detecting in which direction the left eye of the viewer is watching.

Reference numeral 110 denotes a line-of-sight direction determination unit for right eye (referred as "right line-of-sight direction determination unit", hereinafter) and it analyzes signals from an eye movement detector for right eye 111, and inputs line-of-sight information of right eye with respect to the head position to the operation unit 103. The eye-movement detector for right eye 111 (referred as "right eye-movement detector", hereinafter) is for detecting in which direction the right eye of the viewer is watching.

Figure 2:
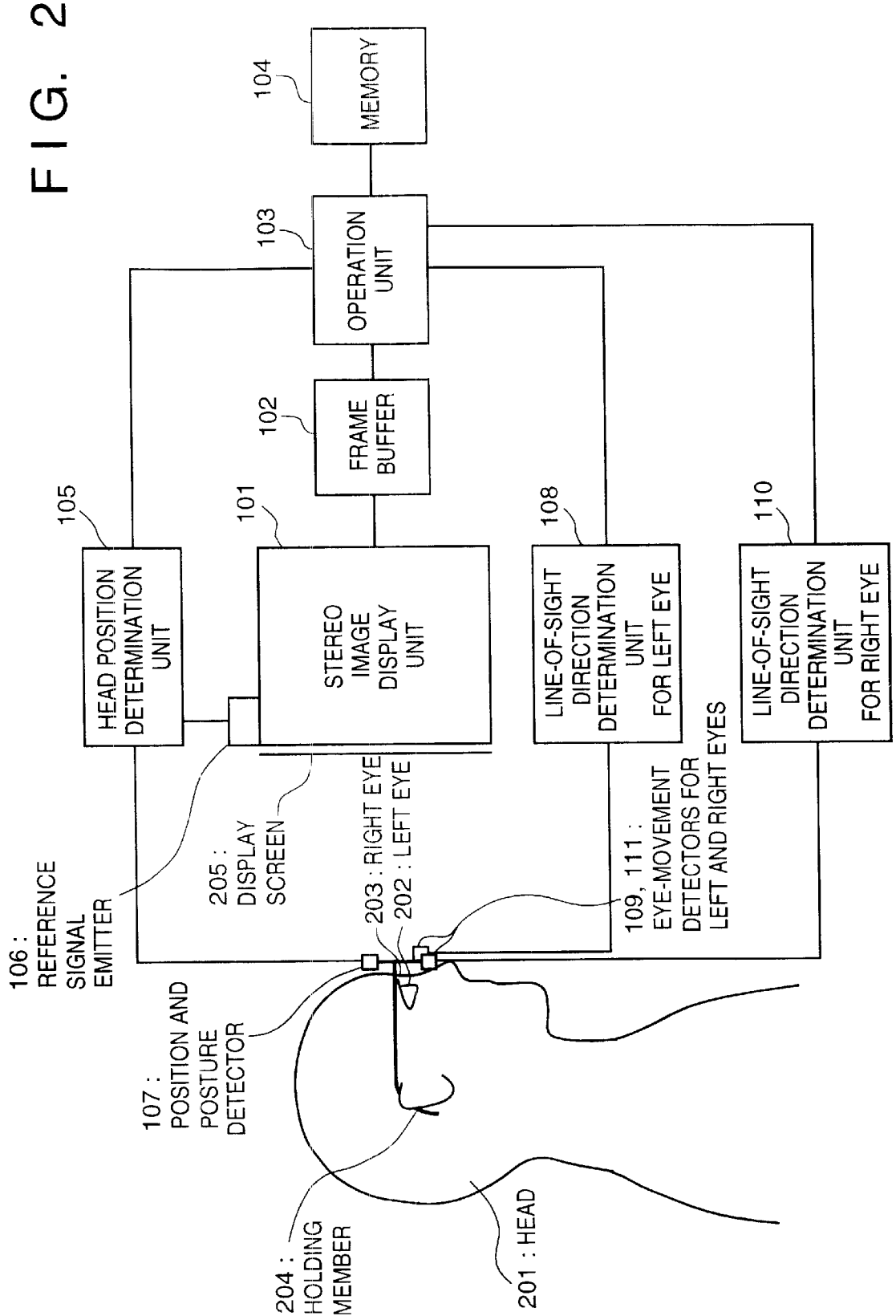
FIG. 2 is a graphical representation showing a brief arrangement of the elements of the stereo image generating and displaying apparatus shown in FIG. 1 according to the first embodiment.

FIG. 2 is a graphical representation showing brief arrangement of the elements which compose the stereo image generating and displaying apparatus according to the first embodiment.

In FIG. 2, the reference signal emitter 106 is fixed on the stereo image display unit 101 in the first embodiment. Reference numeral 205 denotes a display screen of the stereo image display unit 101. The reference signal emitter 106 can be placed in other position which is fixed in a coordinate system defining the stereo image display unit. For example, the reference signal emitter 106 can be fixed on a stand where the stereo image display unit 101 is fixed.

Further, the position and posture detector 107 and the left and right eye-movement detectors 109 and 111 are fixed on head 201 of the viewer by a holding member having a shape of a glass frame. Thus, the eye-movement detectors 109 and 111 are placed in front of left and right eyes of the viewer, respectively. Other units can be arranged at arbitrary positions.

Figure 3:
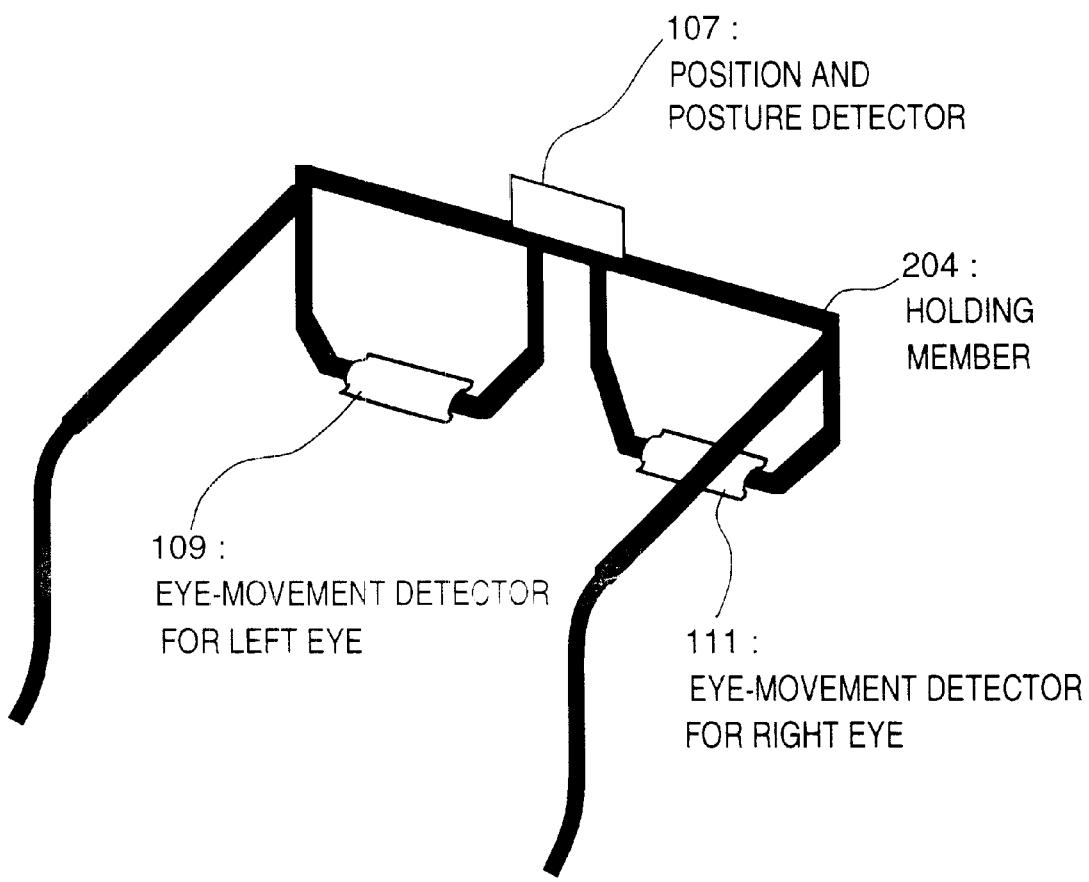
FIG. 3 is a holding member of detectors according to the first embodiment.

FIG. 3 is a holding member 204 for holding detectors. The holding member 204 may have a right and left stereo image separating function, such as circular polarizing filters and liquid crystal shutters, which is necessary for observing stereo images displayed by the stereo image display unit 101 as a unified image.

Figure 4:
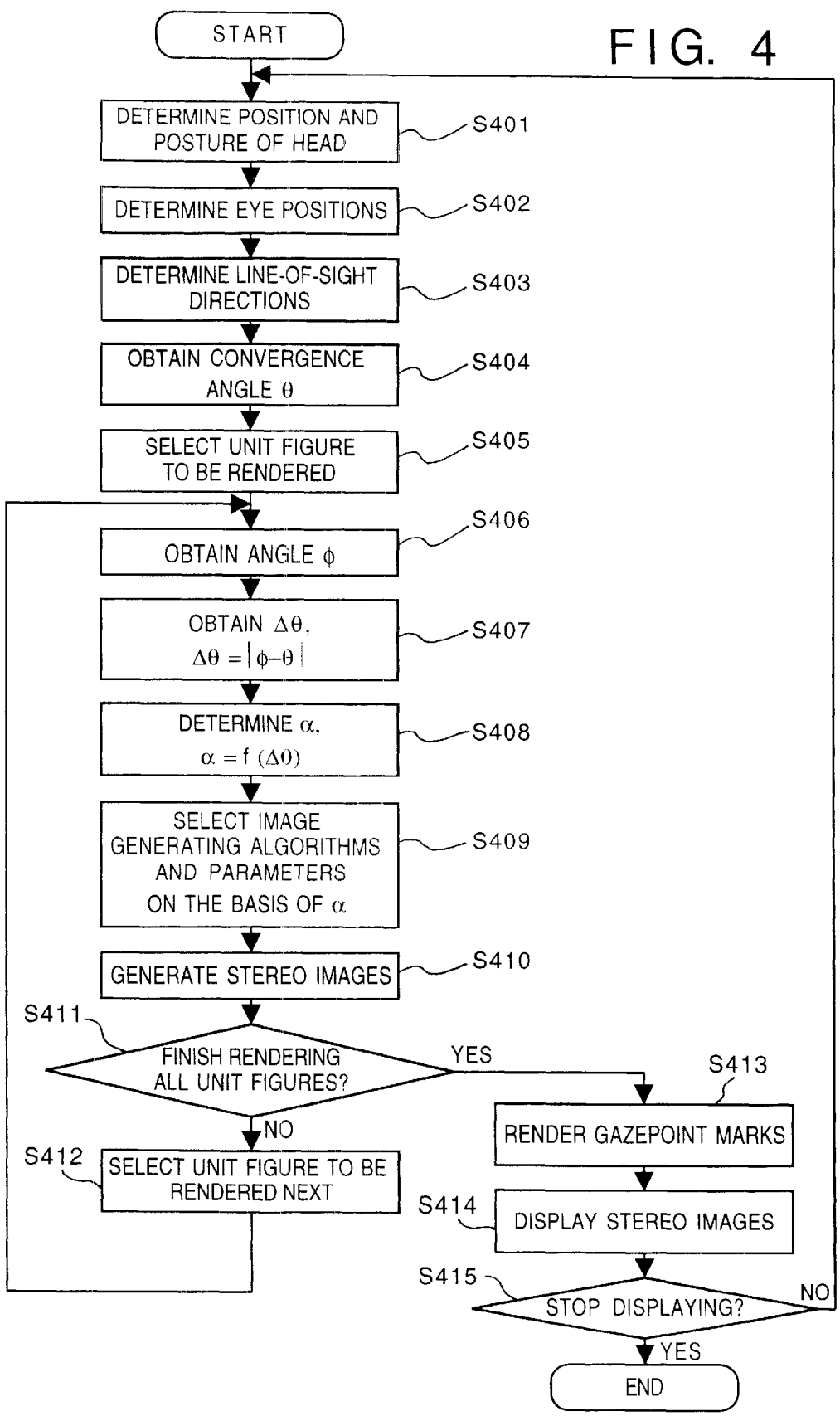
FIG. 4 is a flowchart showing a processing sequence according to the first embodiment.

FIG. 4 is a flowchart showing a stereo image processing sequence according to the first embodiment. Process at each step will be described below in detail.

First at step S401, the head position determination unit 105 determines a position and posture of the position and posture detector 107 with respect to the position and posture of the reference signal emitter 106.

Further, coordinates of the position and posture information of the position and posture detector 107 are changed to coordinates and information in a coordinate system defining figure data to be displayed. The changed coordinates of the position and the posture information are determined as position and posture of the viewer's head.

At step S402, values of a left eye position 202 and a right eye position 203 in a coordinate system defining figure data to be displayed are calculated. The calculation is performed in such a manner, for example, that differences between coordinate values of a position of the position and posture detector 107 and coordinate values of the detected left eye position 202 and the right eye position 203 are stored as offset values in advance, then these offset values are added to coordinate values of the position and posture detector 107 in the coordinate system defining figure data to be displayed.

Figure 5:
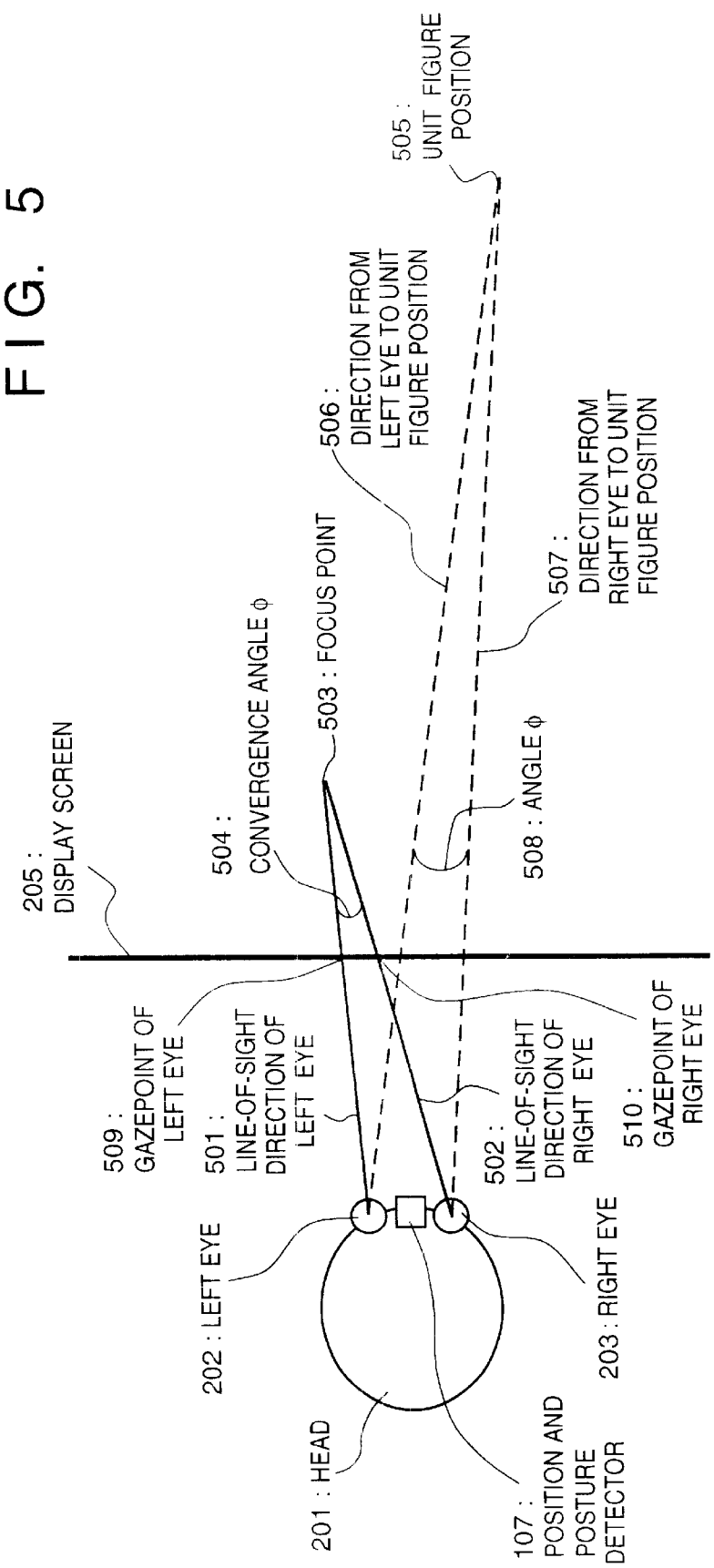
FIG. 5 is a graphical representation showing position relationship between a focus point and lines of sight of right and left eyes of a viewer, and an image display screen according to the first embodiment.

At step S403, the left and right line-of-sight direction determination units 108 and 110 analyze signals from the left and right eye-movement detectors 109 and 111, respectively, and obtain vector information of line-of-sight directions. Then, on the basis of the vector information and posture information of the viewer's head, a line-of-sight direction of left eye 501 (referred as "left line-of-sight direction", hereinafter) and a line-of-sight direction of right eye 502 (referred as "right line-of-sight direction", hereinafter), both shown in FIG. 5, in the coordinate system where the figure data is defined are calculated. FIG. 5 is a graphical representation showing position relationship between a focus point of left and right eyes, lines-of-sight, an image display screen, and a unit figure. It should be noted that FIG. 5 is illustrated in the coordinate system where figure data to be displayed is defined.

At step S404, an angle 504 made between the left and right line-of-sight directions 501 and 502 is obtained and it is defined as a convergence angle $\theta$.

Next at step S405, data of a unit figure to be rendered at first is selected from the top of the figure data list which is stored as shown in FIG. 6. Elements of the figure data list are identification number of figure data, figure type, geometrical data of figure, and so on.

At step S406, an angle $\phi$ made between a direction 506 from the left eye 202 to a unit figure position 505 and a direction 507 from the right eye 203 to the unit figure position 505 is calculated.

At step S407, an absolute value of an angular difference $\Delta\theta$ between the convergence angle $\theta$ and the angle $\phi$ is calculated. Next at step S408, a visual acuity factor $\alpha$ of the unit figure at the unit figure position 505 is determined in accordance with the obtained angular difference $\Delta\theta$.

Figure 7:
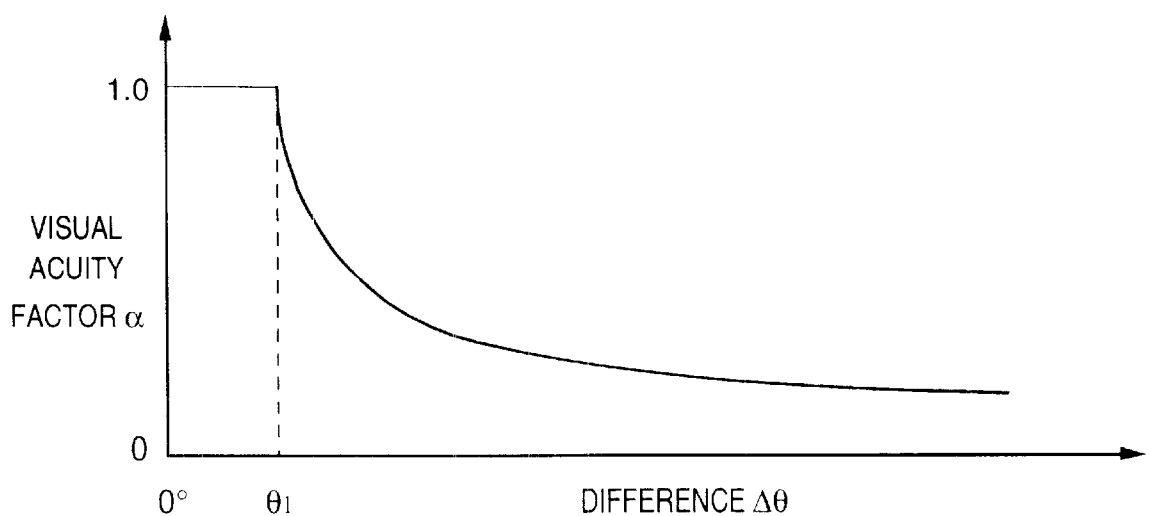
FIG. 7 is an example of a graph of a visual acuity factor curve according to the first embodiment.

When the angular difference $\Delta\theta$ is within a couple of degrees ($\theta_1$), it is determined that the unit figure is at a position inside of the fusional area, and the value of the visual acuity factor $\alpha$ is the maximum. As the value of the angular difference $\Delta\theta$ increases, the value of the visual acuity factor $\alpha$ decreases, since it is determined that the unit figure is at a position far from the fusional area when $\Delta\theta$ is large. In the first embodiment, the value of the visual acuity factor $\alpha$ decreases exponentially, as shown in FIG. 7.

Obviously, the value of the visual acuity factor reaches the maximum when the angular difference $\Delta\theta$ is 0, namely when a unit figure is at the center of the fusional area. In the embodiment, a normalized visual acuity factor $\alpha$ normalized in accordance with the maximum visual acuity factor and having 1 as the maximum value is used. Values of the visual acuity factor $\alpha$ corresponding to the angular difference $\Delta\theta$ are defined by a mathematical function or by a data table.

At step S409, an image generation algorithm and its parameters are selected depending upon the visual acuity factor $\alpha$. More precisely, a threshold of the visual acuity factor $\alpha$ is predetermined, and if the visual acuity factor $\alpha$ is larger than the threshold, then it is determined that a unit area is inside of a fusional area, whereas, if the visual acuity factor $\alpha$ is equal or smaller than the threshold, then it is determined that the unit area is outside of the fusional area. Then, the algorithm and the parameters are selected so that, if the unit figure exists inside of the fusional area, an image of the unit figure is generated in high precision, whereas, if a unit figure is at positions far from the fusional area, a algorithm which requires light calculation load for generating an image of the unit figure is selected.

Figure 8:
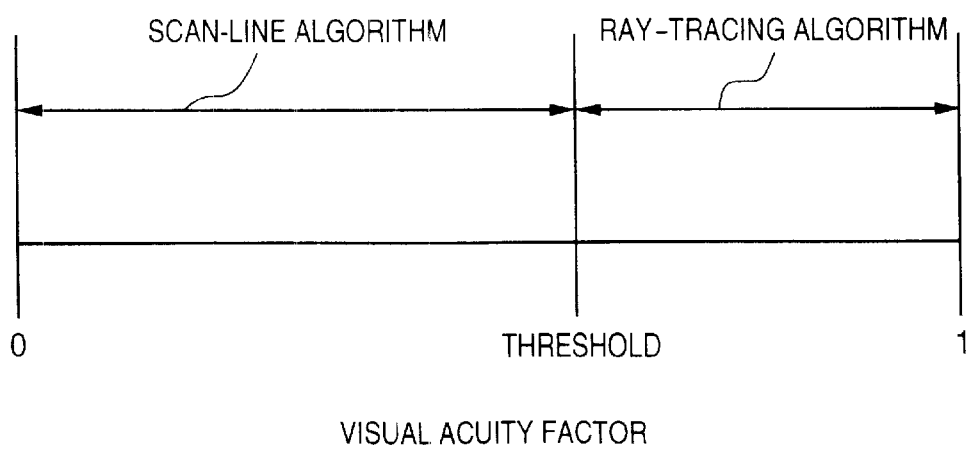
FIG. 8 is a graphical representation showing selections of image generation algorithms according to the first embodiment.

In the first embodiment, as for image generation algorithms, a scan-line algorithm is used for generating an image of unit figures which are in an area where the visual acuity factor is equal or smaller than a predetermined threshold, and a ray-tracing algorithm is used for generating an image of unit figures which are in an area where the visual acuity factor is greater than the threshold, as shown in FIG. 8. Further, in the embodiment, precision of figure data can be changed on the basis of the visual acuity factor by changing parameters used in the selected algorithm.

The ray-tracing algorithm requires heavy calculation load, however, it is possible to express an image in detail. Therefore, it is suitable for rendering inside of the fusional area. In contrast, the scan-line algorithm does not realize detailed expression of an image, however, requires light calculation load. Therefore, it is suitable for rendering outside of the fusional area.

Further, it is possible to construct the apparatus so as to be able to change the threshold arbitrarily. Especially, if it is difficult for the operation unit 103 to perform the ray-tracing algorithm at high speed because operational speed of the operation unit 103 is slow, the threshold of the visual acuity factor $\alpha$ can be set very large so as to reduce calculation load. As an extreme example, by setting the threshold to the maximum value of the visual acuity factor, only the scan-line algorithm is selected.

In the first embodiment, the parameters to be changed in accordance with the visual acuity factor are related to precision of unit figure, and used for controlling resolution of the unit figure to be rendered. These parameters works so as to change the number of figure elements, such as polygon patches and lines, in a following image generation step.

At step S410, data for stereo images for left and right eyes are generated by using the image generation algorithms selected at step S409, and stored in the frame buffer 102. In this embodiment, elements (e.g., number of polygons, texture information, maximum reflection number in the ray-tracing algorithm) shown in FIG. 10 are controlled.

Figure 11:
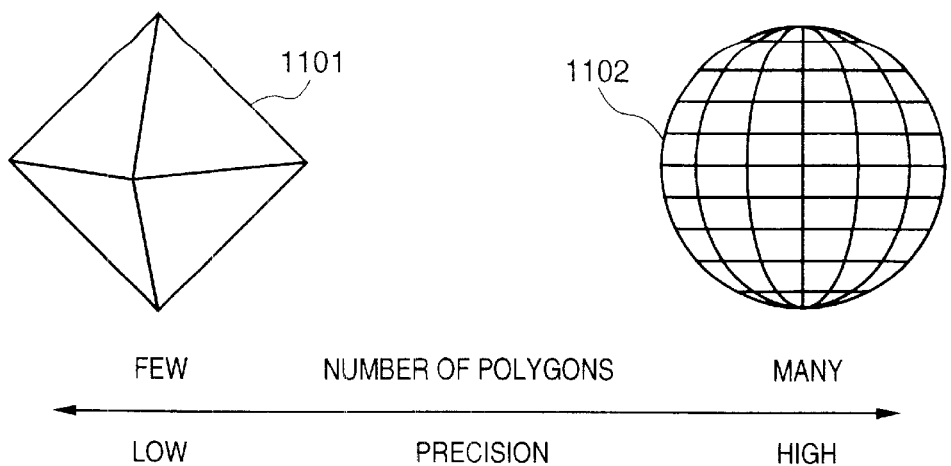
FIG. 11 is a graphical representation for explaining control of a rendering number of polygons on the basis of required precision according to the first embodiment.

In FIG. 10, the number of polygons is the number of polygon patches constructing an object to be rendered. When required precision is high, the object is rendered by using large number of polygon patches, thereby expressing in great detail. The shape 1102 in FIG. 11 is an example of a sphere expressed precisely by using many polygon patches.

In contrast, when required precision is low, by rendering unit figures by using few polygon patches, calculation load for generating an image is reduced. The shape 1101 in FIG. 11 is an example of the sphere expressed roughly by using few polygon patches.

Regarding rendering with polygon patches, two methods are possible: a method to change polygon data, prepared in advance, as rendering the data; and a method to change sizes of polygons when dividing surfaces defined by non-polygons, such as free curvatures, to render the surfaces.

Texture resolution in FIG. 10 is directly related to pixel density of an image for expressing patterns of a figure, and when high resolution is required, the number of pixel is increased, thereby expressing the pattern more precisely. Regarding the maximum reflection number, it will be explained later.

Figure 12:
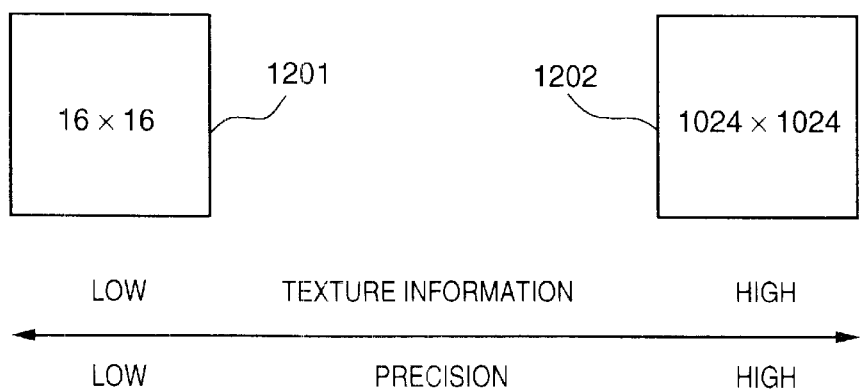
FIG. 12 is a graphical representation for explaining control of texture resolution on the basis of required precision according to the first embodiment.

An area 1202 in FIG. 12 is an example representing density of texture data of high resolution expressed with 1024×1024 pixels. In contrast, when required precision is low, the number of pixels is decreased, thereby reducing the number of data to be processed as well as reducing calculating load. An area 1201 in FIG. 12 is an example representing density of texture data of low resolution expressed with 16×16 pixels.

At step S411, whether all unit figures are rendered in stereo images or not is judged, and if there is any unprocessed unit figure in the data list, then at step S412, a unit figure to be rendered next is selected from the data list, and the processes from step S406 to S411 are repeated.

Whereas, if it is determined that all the unit figure are rendered at step S411, then the process moves to step S413 where marks which represent a gazepoint of left eye 509 (referred as "left gazepoint", hereinafter) and a gazepoint of right eye 510 (referred as "right gazepoint", hereinafter) on the display screen 205 are rendered over respective left and right stereo images which are stored in the frame buffer 102 at the right and left gazepoints 509 and 510. It is convenient to choose a shape and color of the mark which can be easily distinguished from a background image, and to choose its size to be small. Further, the marks for right and left gazepoints having the same attribute and shape are better. A yellow cross mark may be suggested as an example of the mark.

Next at step S414, the right and left stereo images, including the gazepoint marks, stored in the frame buffer 102 are displayed by the stereo image display unit 101.

At step S415, whether a viewer instructed to stop displaying images or not is determined. If there is no such instruction, then the processes from step S401 to step S415 are repeated. If there is an instruction to stop displaying images, the process is interrupted.

As described above, by changing expressing methods on the basis of a threshold of a visual acuity factor, it is possible to reduce processing load. Further, by constructing the apparatus so as to be capable of changing a threshold arbitrarily, it is possible to enlarge or reduce areas to be expressed in detail, thereby generating and displaying stereo images by using suitable methods.

<Second Embodiment>

An image displaying method and apparatus of a second embodiment will be described below.

A basic structure of the image generating and displaying apparatus and an arrangement of the elements in the second embodiment are the same as those in the first embodiment expressed with reference to FIGS. 1 and 2.

A processing sequence of an image generating and displaying method according to the second embodiment is shown in the flowchart in FIG. 4, as in the first embodiment. Detailed processes at all steps except step S409 in FIG. 4 are the same as the first embodiment.

Basic process at step S409 in the second embodiment is basically the same as the one in the first embodiment, however, there are some differences. At step S409 in the second embodiment, a wire frame representation is used for processing a unit figure whose visual acuity factor is equal or smaller than a predetermined threshold, and a surface representation is used for processing a unit figure whose visual acuity factor is greater than the threshold.

In the wire frame representation, since only outlines of polygon shapes are rendered, resolution quality is low, however, it requires light calculation load. Therefore, this method is suitable to express unit figures outside of a fusional area. Further, in the surface representation, although it requires larger calculation load than the wire frame representation, it is possible to express polygon shapes in detail. Accordingly, this method is suitable to express unit figures inside of a fusional area. Further, it is possible to construct the apparatus so as to be capable of changing a threshold of a visual acuity factor arbitrarily.

<Third Embodiment>

Next, a third embodiment will be described.

A basic structure of the image generating and displaying apparatus and an arrangement of the elements in the third embodiment are the same as those in the first embodiment expressed with reference to FIGS. 1 and 2.

A processing sequence of an image generating and displaying method according to the third embodiment is shown in the flowchart in FIG. 4, as in the first embodiment. Detailed processes at all steps except step S409 in FIG. 4 are the same as the first embodiment.

Basic process at step S409 in the third embodiment is basically the same as the one in the first embodiment, however, there are some differences. At step S409 in the third embodiment, texture mapping is not performed for processing a unit figure whose visual acuity factor is equal or smaller than a predetermined threshold, and texture mapping is performed for processing a unit figure whose visual acuity factor is greater than the threshold.

The texture mapping requires heavy calculation load for generating an image, however, it is possible to increase the quality of the image. Therefore, it is suitable to express unit figures are inside of a fusional area. Further, by omitting texture mapping when processing unit figures outside of the fusional area, it is possible to greatly reduce calculation load.

<Fourth Embodiment>

A fourth embodiment will now be explained.

A basic structure of the image generating and displaying apparatus and an arrangement of the elements in the fourth embodiment are the same as those in the first embodiment expressed with reference to FIGS. 1 and 2.

Further, a processing sequence of an image generating and displaying method according to the fourth embodiment is shown in the flowchart in FIG. 4, as in the first embodiment. Detailed processes at all steps except step S409 in FIG. 4 are the same as the first embodiment.

Basic process at step S409 in the fourth embodiment is basically the same as the one in the first embodiment, however, there are some differences. At step S409 in the fourth embodiment, smooth shading to be used in rendering unit figures is changed. The smooth shading is for making neighboring portions of polygons smooth when rendering polygons which express curvatures.

Figure 13:
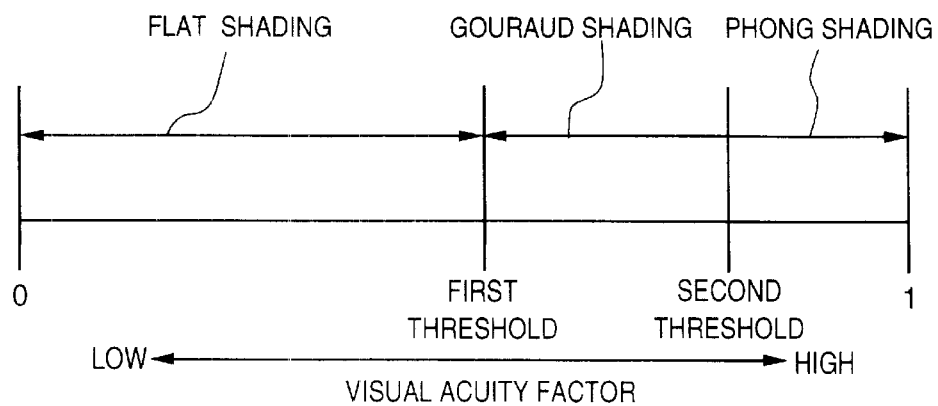
FIG. 13 is a graphical representation showing selections of image generation algorithms according to a fourth embodiment.

As shown in FIG. 13, a flat shading is used for processing a unit figure whose visual acuity factor is equal or smaller than a predetermined first threshold, a Gouraud shading is used for processing a unit figure whose visual acuity factor is greater than the first threshold but equal or smaller than a predetermined second threshold, and a Phong shading is used for processing a unit figure whose visual acuity factor is greater than the second threshold.

The Phong shading requires relatively heavy calculation load, however, it is possible to express curvatures by polygons effectively. Therefore, it is suitable to render unit figures which are required to be rendered in a high visual acuity factor. In contrast, the flat shading is a method which does not perform smooth shading. When the flat shading is used, curvatures represented by polygons are expressed roughly, and do not look smooth, however, it requires light calculation load. Accordingly, this method is suitable to render unit figures which are required to be rendered in a low visual acuity factor.

As for the Gouraud shading, calculation load and quality of an image generated by using the Gouraud shading are placed intermediate between the Phong shading and the flat shading. Thus, the Gouraud shading is suitable to render unit figures which are required to be rendered in an intermediate visual acuity factor.

<Fifth Embodiment>

A fifth embodiment will be described.

A basic structure of the image generating and displaying apparatus and an arrangement of the elements in the fifth embodiment are the same as those in the first embodiment expressed with reference to FIGS. 1 and 2.

A processing sequence of an image generating and displaying method according to the fifth embodiment is shown in the flowchart in FIG. 4, as in the first embodiment. Detailed processes at all steps except step S409 in FIG. 4 are the same as the first embodiment.

Basic process at step S409 in the fifth embodiment is basically the same as the one in the first embodiment, however, there are some differences. In selecting parameters at step S409 in the fifth embodiment, the maximum number of times of ray reflection tracing is selected sufficiently large in ray-tracing algorithm for processing a unit figure whose visual acuity factor is greater than a predetermined threshold, whereas the maximum number of times of ray reflection tracing (see FIG. 10) is set to a small number for processing a unit figure whose visual acuity factor is equal or smaller than the threshold.

In generating an image by using the ray-tracing algorithm, if the number of times of ray reflection tracing is set to a sufficiently large number, a high precision image can be obtained, thus suitable to render unit figures which are required to be rendered in a high visual acuity factor. Whereas, by reducing the number of times of ray reflection tracing for expressing unit figures which are required to be rendered in a low visual acuity factor, calculation load can be reduced.

<Sixth Embodiment>

Next, a sixth embodiment will be explained.

A basic structure of the image generating and displaying apparatus and an arrangement of the elements in the sixth embodiment are the same as those in the first embodiment expressed with reference to FIGS. 1 and 2.

A processing sequence of an image generating and displaying method according to the sixth embodiment is shown in the flowchart in FIG. 4, as in the first embodiment. Detailed processes at all steps except step S409 in FIG. 4 are the same as the first embodiment.

Basic process at step S409 in the sixth embodiment is basically the same as the one in the first embodiment, however, there are some differences. At step S409 in the sixth embodiment, when a translucent part is included in a unit figure to be rendered, a mode for rendering a translucent image is selected for processing a unit figure whose visual acuity factor is greater than a predetermined threshold. Whereas, a mode for rendering an opaque image is selected for processing a unit figure whose visual acuity factor is equal or smaller than the threshold.

In this case, when a translucent object shape having a complex inner structure is rendered as a translucent image, a viewer can easily understand the inner structure, however, increasing calculation load. Accordingly, by expressing unit figures in translucent mode only inside of a fusional area and by expressing unit figures in opaque mode outside of a fusional area, calculation load can be reduced.

<Seventh Embodiment>

Next, a seventh embodiment will be described.

Figure 14:
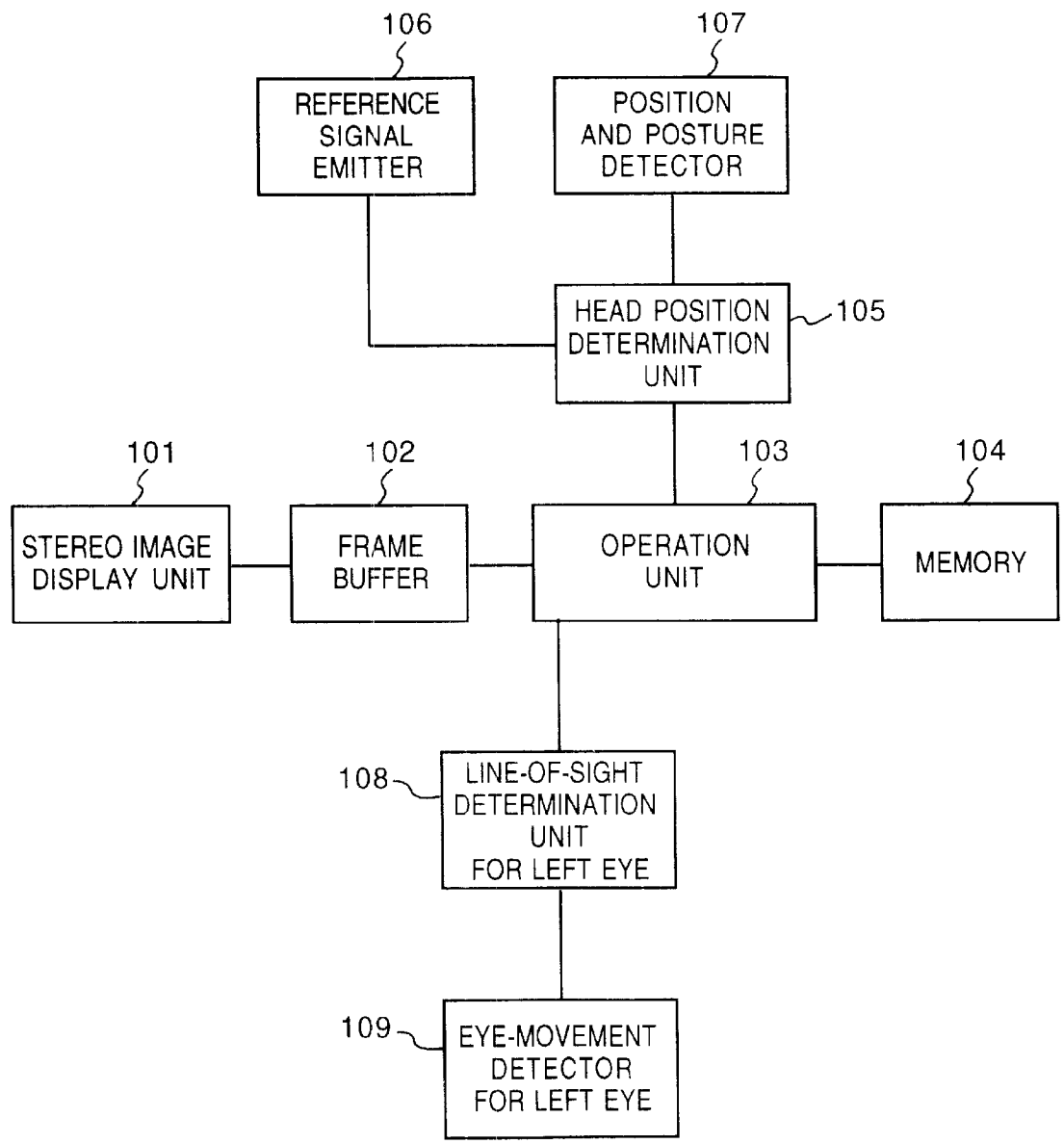
FIG. 14 is a block diagram a basic configuration of a stereo image generating and displaying apparatus according to the seventh embodiment.
Figure 15:
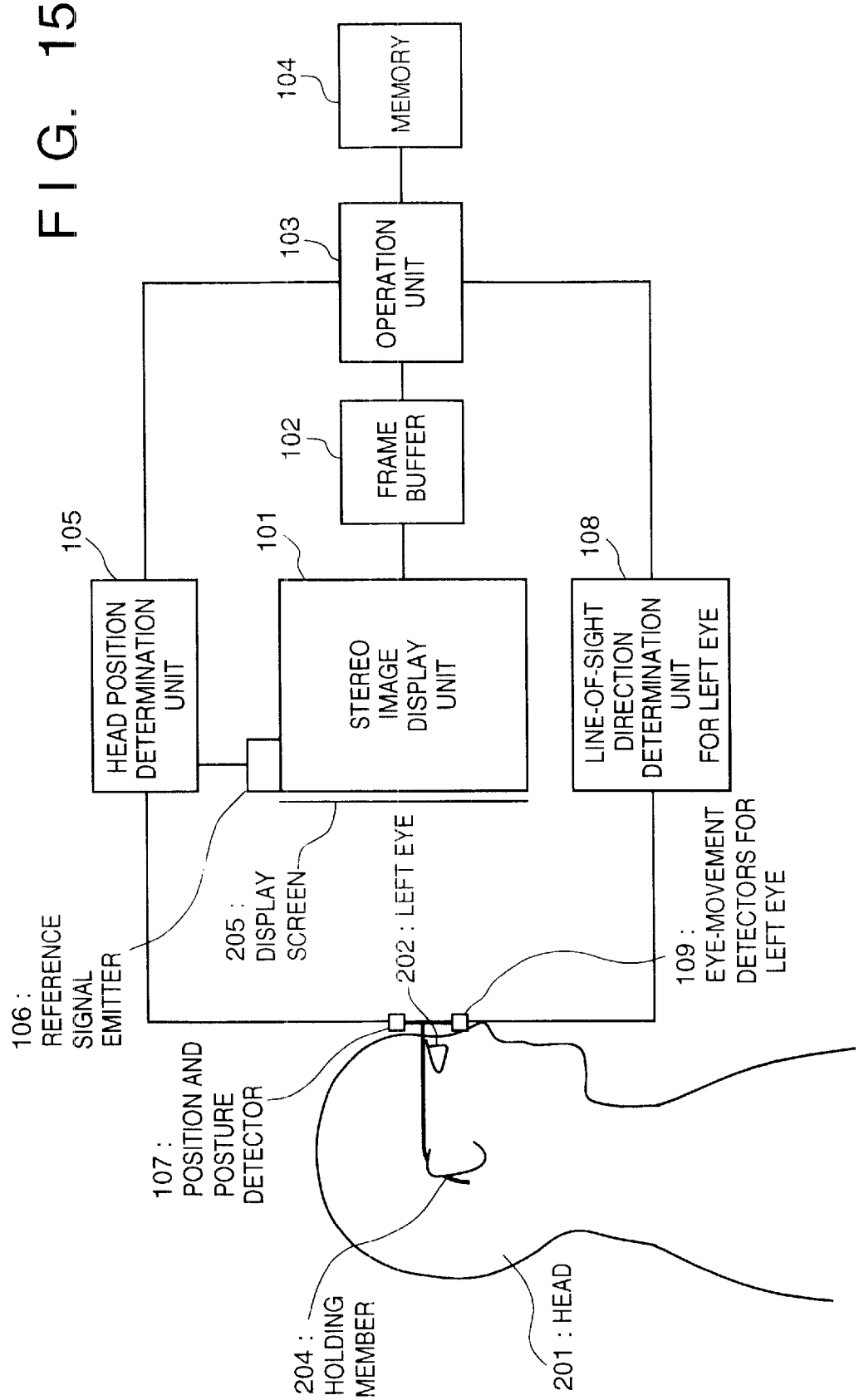
FIG. 15 is a graphical representation showing a brief arrangement of the elements of the stereo image generating and displaying apparatus shown in FIG. 14 according to the fourth embodiment.

A basic configuration of an image generating and displaying apparatus according to the seventh embodiment is shown in FIG. 14. Further, a brief arrangement of the elements of the image generating and displaying apparatus of the seventh embodiment is shown in FIG. 15. The brief arrangement of the elements is almost the same as the one in the first embodiment described with reference to FIG. 2, except an eye-movement detector and a line-of-sight direction determination unit for either right or left eye which is not a leading eye are removed. Here, "a leading eye" means the eye which is mainly used, unconsciously.

Figure 16:
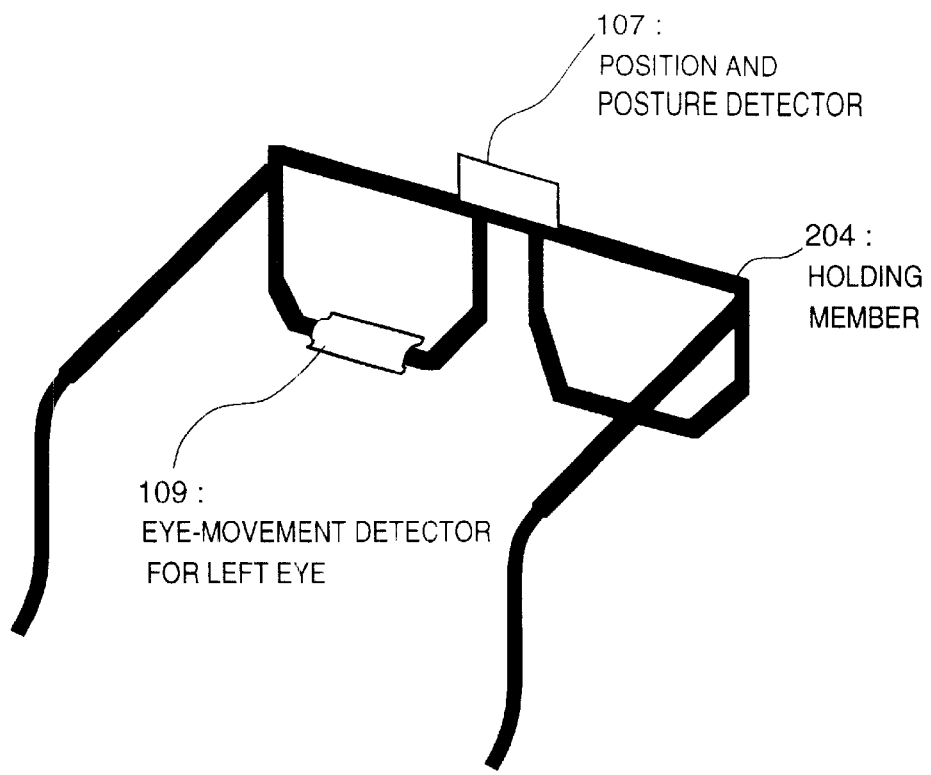
FIG. 16 is a holding member of detectors according to the fourth embodiment.

The leading eye is determined by using a known method in advance, and an eye-movement detector for the leading eye (in the seventh embodiment, the eye-movement detector for left eye 109 is used) is fixed on a holding member 204 as shown in FIG. 16.

An image generating and displaying processing in the seventh embodiment is shown by the flowchart in FIG. 4, and detailed processes at all steps except step S403 are the same as those expressed in one of the first to sixth embodiments.

In the seventh embodiment, a line-of-sight direction of the leading eye is determined, and missing parameters which are not obtained from detection are supplemented on the basis of assumption, thus deciding a line-of-sight direction of a non-leading eye.

Detailed process at step S403 is described below.

At step S403, it is assumed that the line-of-sight direction 502 (or 501) of the non-leading eye 203 (or 202) is toward the point 503, shown in FIG. 5, which the leading eye 202 is watching. Accordingly, if the line of sight direction 501 (or 502) of the leading eye 202 (or 201) and the point 503 are determined, the line of sight direction 502 (or 501) of the non-leading eye 203 (or 202) can be decided.

First, a signal from the eye-movement detector 109 (or 111) for the leading eye 202 (or 203) is analyzed by the line-of-sight determination unit 108 (or 110), then a line-of-sight direction of the leading eye 501 (or 502) in a coordinate system where figure data is defined is calculated in accordance with obtained vector information, as an analyzed result by the line-of-sight determination unit 108 (or 110), and posture information which is obtained at step S401.

Next, among all the intersections between the line-of-sight of the leading eye 501 (or 502), originated from a position of the leading eye 501 (or 502), and all figure data, an intersection which is closest to the viewer is selected. The selected point is determined as the focus point 503.

Then, a vector originated from a position of the non-leading eye 203 (or 202) to the focus point 503 is determined as a line-of-sight direction of the non-leading eye 502 (or 501). Thus, the line-of-sight directions of right and left eyes are determined as described above.

<Eighth Embodiment>

Next, an eighth embodiment will be described.

Figure 17:
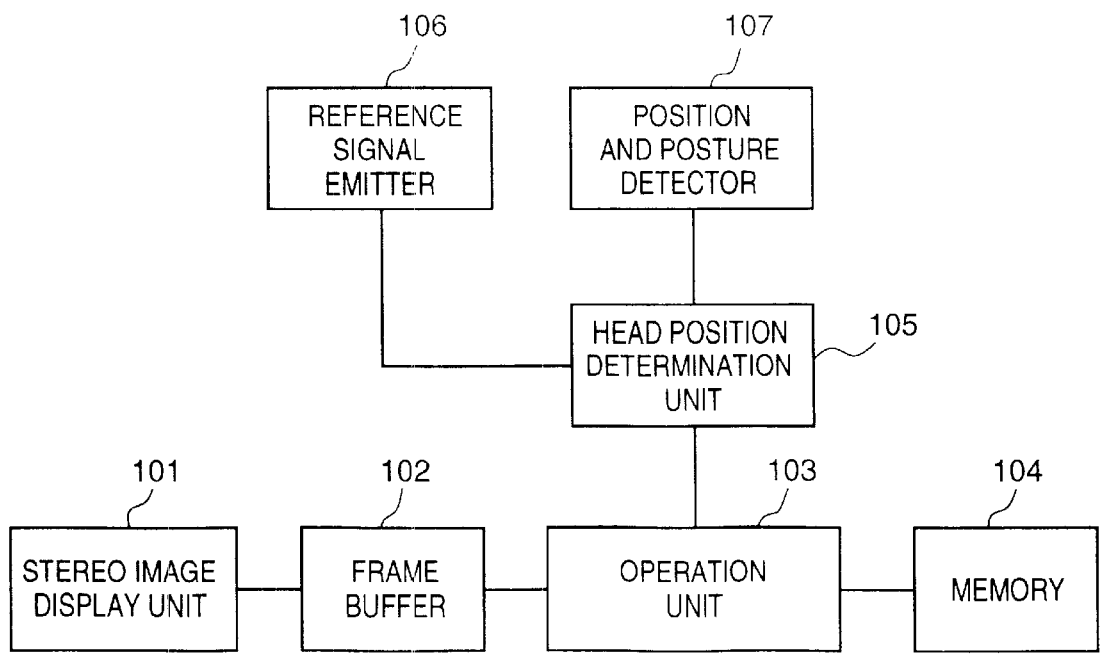
FIG. 17 is a block diagram showing a basic configuration of a stereo image generating and displaying apparatus according to an eighth embodiment.
Figure 18:
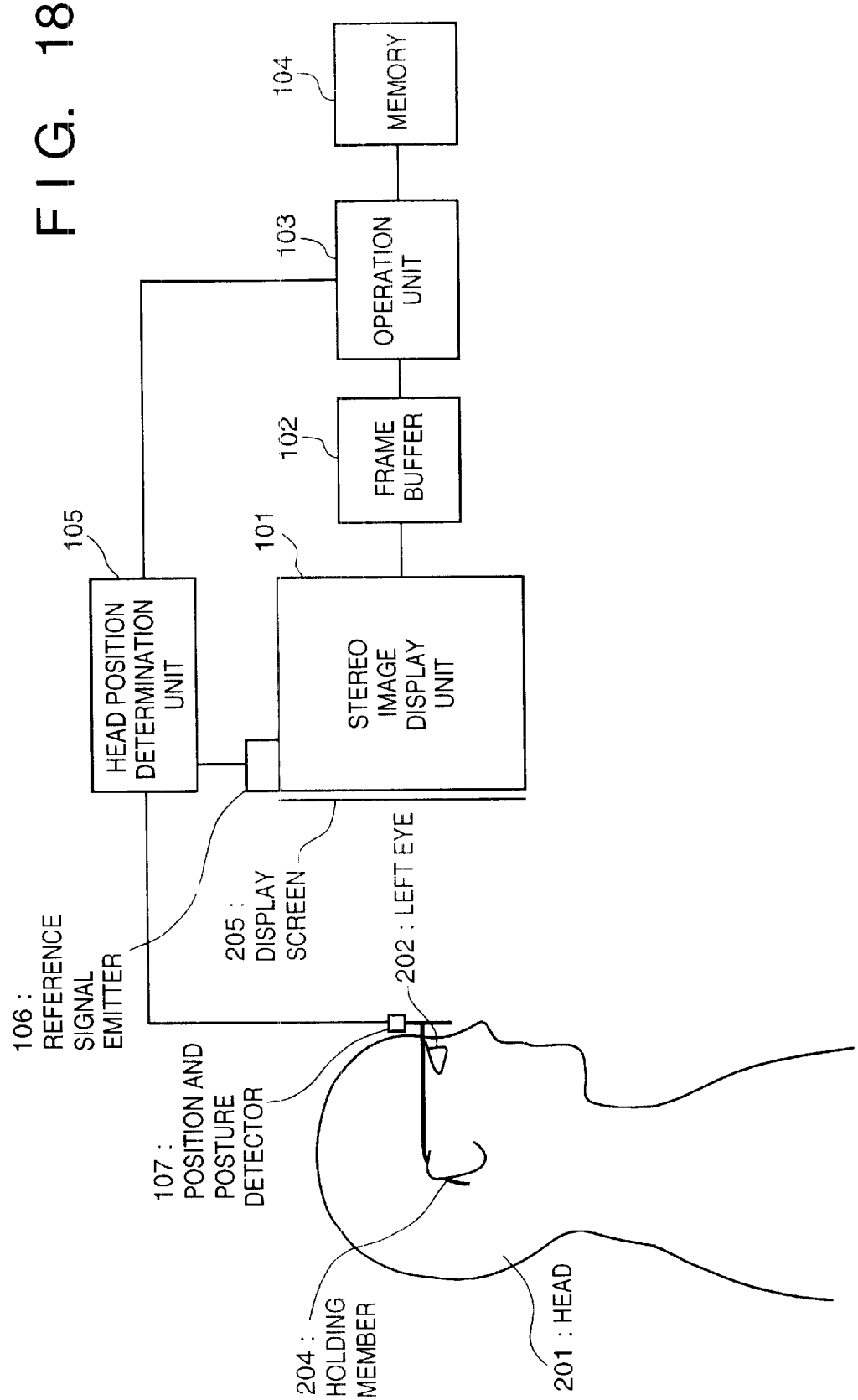
FIG. 18 is a graphical representation showing a brief arrangement of the elements of the stereo image generating and displaying apparatus shown in FIG. 17 according to the eighth embodiment.
Figure 19:
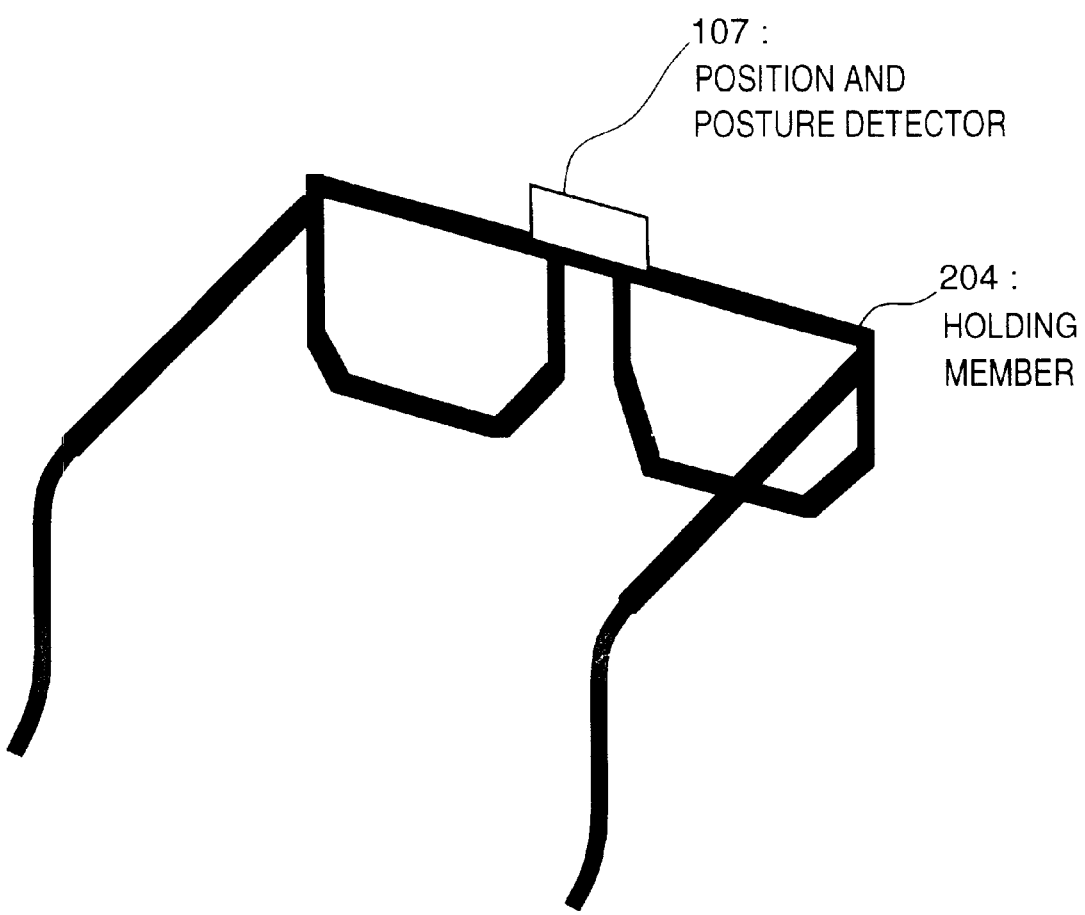
FIG. 19 is a holding member of detectors according to the eighth embodiment.

A basic configuration of an image generating and displaying apparatus according to the eighth embodiment is shown in FIG. 17. The basic configuration of the eighth embodiment is that the left and right eye-movement detectors 109 and 111 and the left and right line-of-sight direction determination units 108 and 110 are removed from the configuration of the first embodiment shown in FIG. 1. Further, a brief arrangement of the elements of the image generating and displaying apparatus of the eighth embodiment is shown in FIG. 18. Furthermore, as shown in FIG. 19, only the position and posture detector 107 is fixed on the holding member 204.

An image generating and displaying processing in the eighth embodiment is shown by the flowchart in FIG. 4 as in the first embodiment, and detailed processes at all steps except step S403 are the same as those expressed in one of the first to sixth embodiments.

In the eighth embodiment, no line-of-sight direction is determined, and missing parameters which can not be obtained from detection are supplemented on the basis of assumption, thus deciding line-of-sight directions of both eyes.

Detailed process at step S403 according to the eighth embodiment is described below.

At step S403, it is assumed that the line-of-sight direction 501 (or 502) of the leading eye 202 (or 203) is always in the direction perpendicular to the viewer's head 201. With this assumption, as posture information on the viewer's head is obtained, the line-of-sight direction of the leading eye is also determined. Regarding a line-of-sight direction of the non-leading eye, it can be obtained on the basis of the line-of-sight direction of the leading eye by performing the process at step S403 of the seventh embodiment.

<Ninth Embodiment>

A ninth embodiment will be described.

Figure 20:
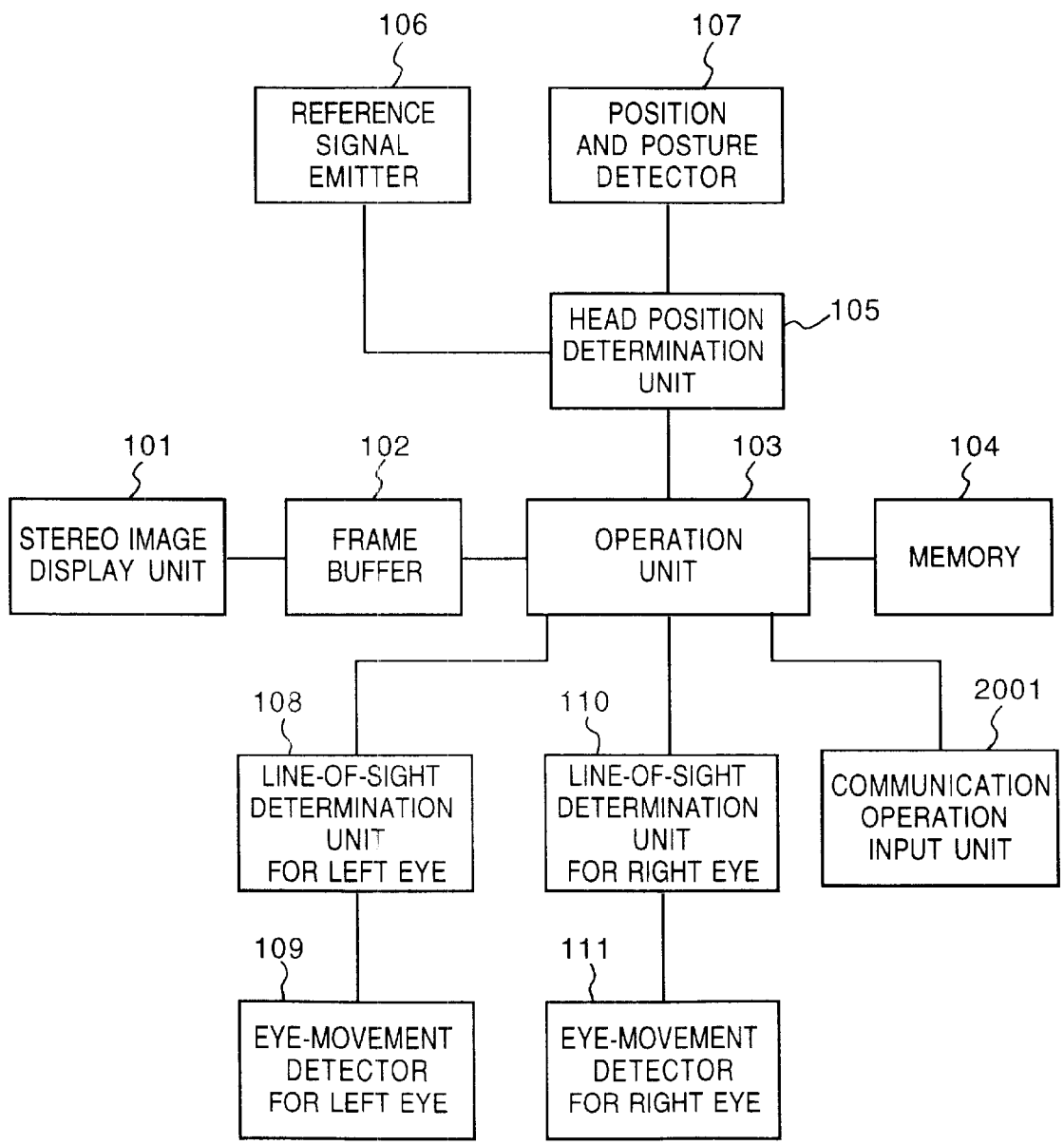
FIG. 20 is a block diagram showing a basic configuration of a stereo image generating and displaying apparatus according to a ninth embodiment.

A basic configuration of an image generating and displaying apparatus according to the ninth embodiment is shown in FIG. 20. The configuration of according to the ninth embodiment is that an interactive input unit 2001 is added to the configuration shown in FIG. 1 in the first embodiment.

The interactive input unit 2001 is provided so as to take viewer's action into consideration in processes for image generation, and a mouse, a keyboard, a dial box, a three dimensional position sensor, a line-of-sight input device, a sound input device, and so on, are available.

Figure 21:
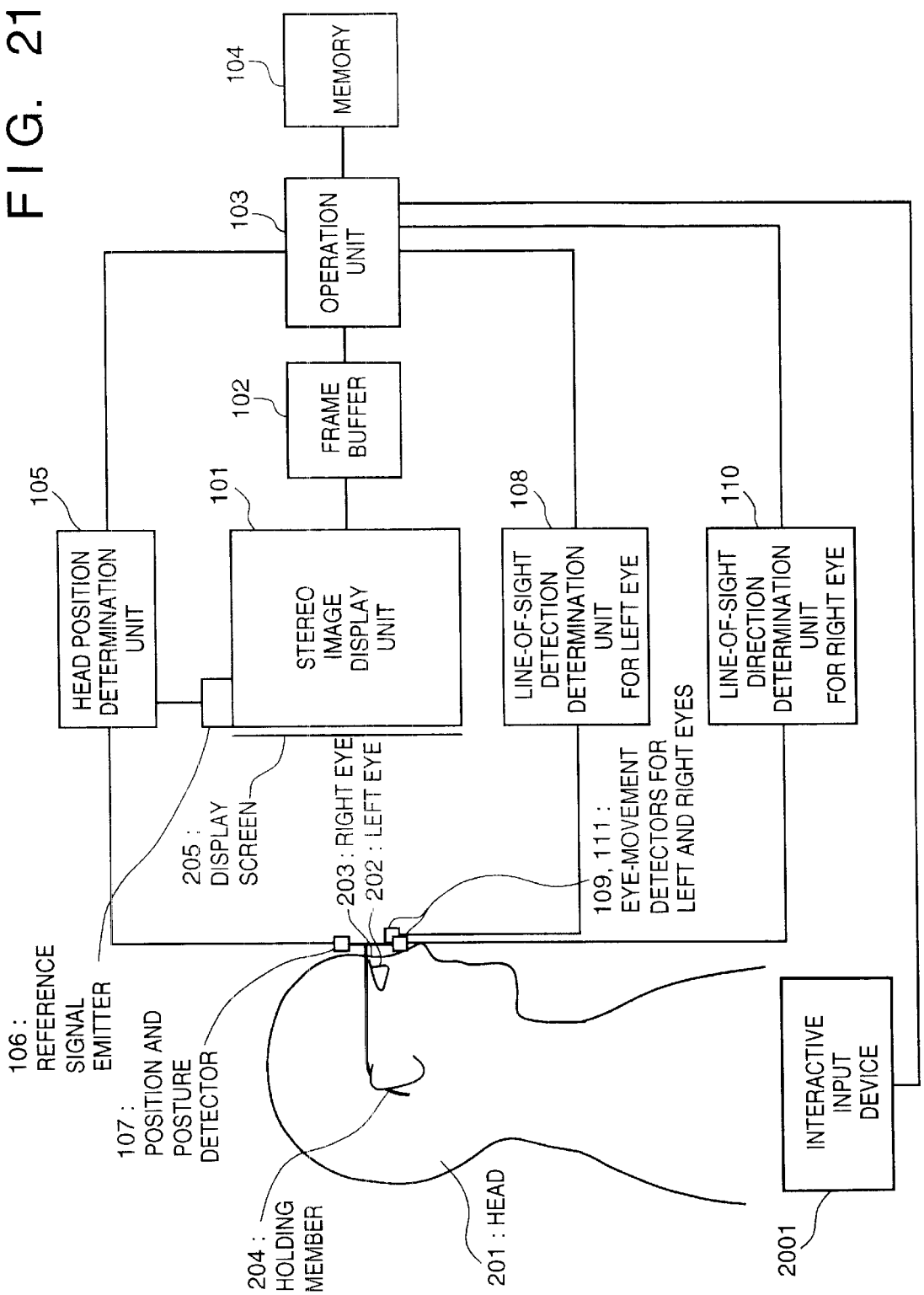
FIG. 21 is a graphical representation showing a brief arrangement of the elements of the stereo image generating and displaying apparatus shown in FIG. 20 according to the ninth embodiment.

Further, a brief arrangement of the elements of the image generating and displaying apparatus of the ninth embodiment is shown in FIG. 21. The arrangement of units according to the ninth embodiment is that the interactive input unit 2001 is added to the arrangement shown in FIG. 2 in the first embodiment.

Figure 22:
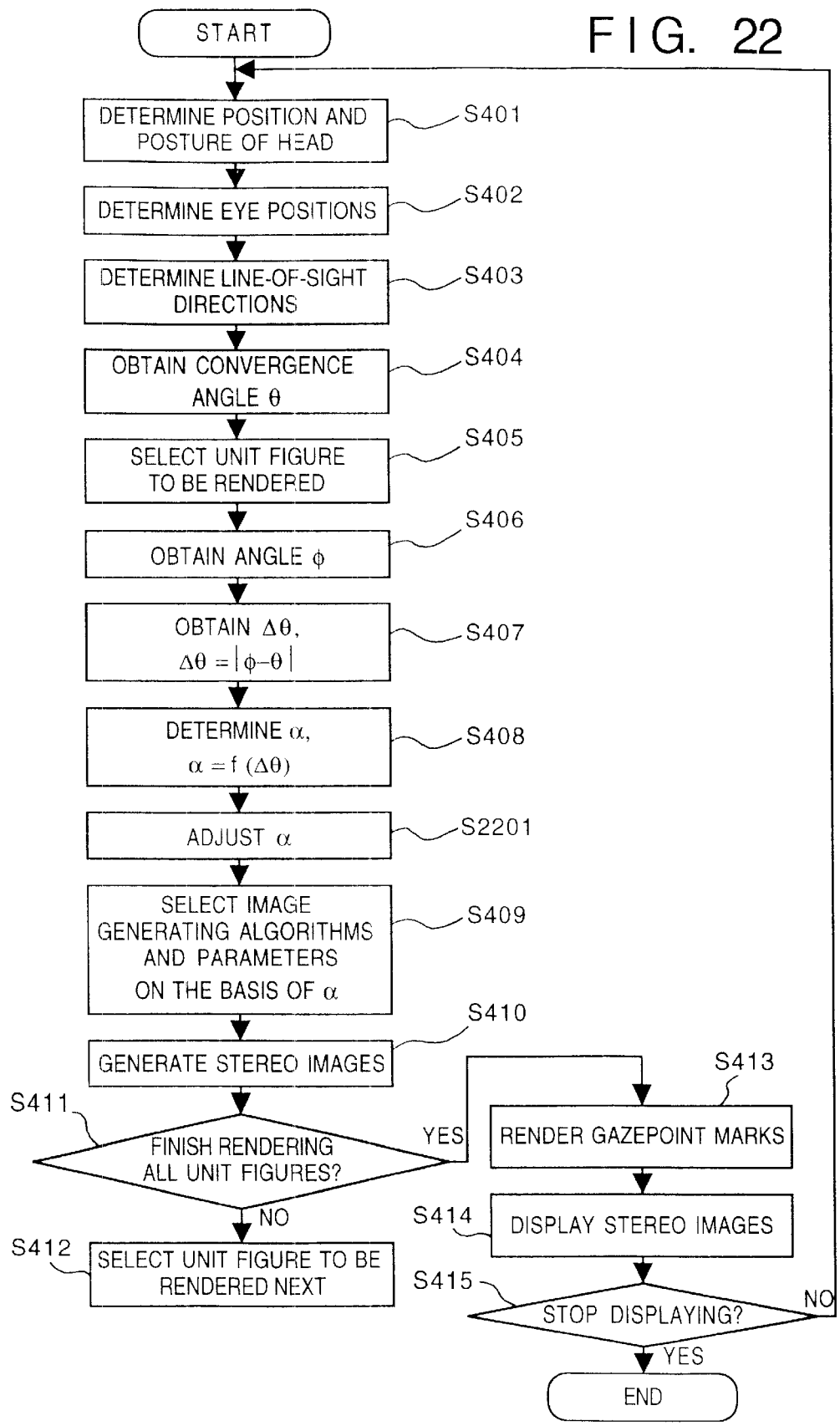
FIG. 22 is a flowchart showing image generating processing according to the ninth embodiment.
Figure 23A:
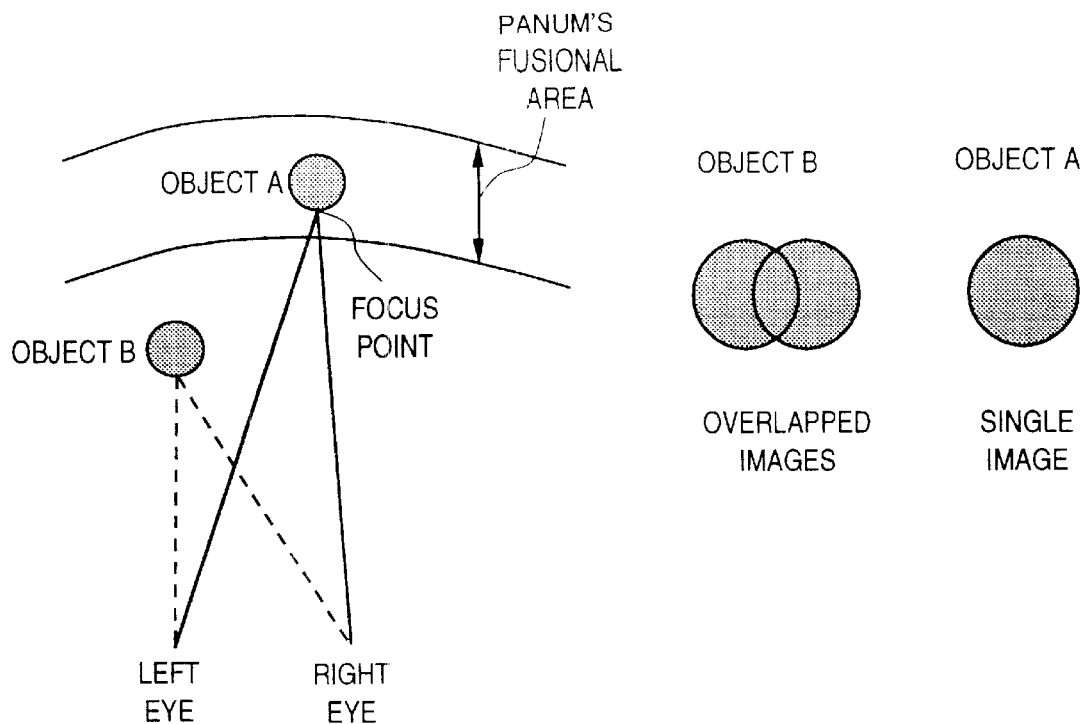
FIGS. 23A and 23B are graphical representations for explaining fusional area and fusion of stereo images.
Figure 23B:
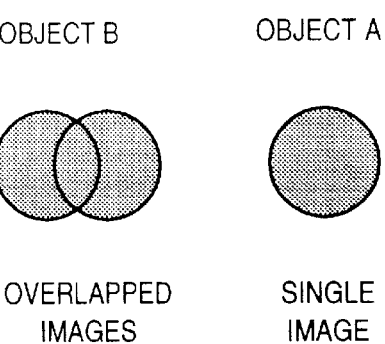
Figure 24:
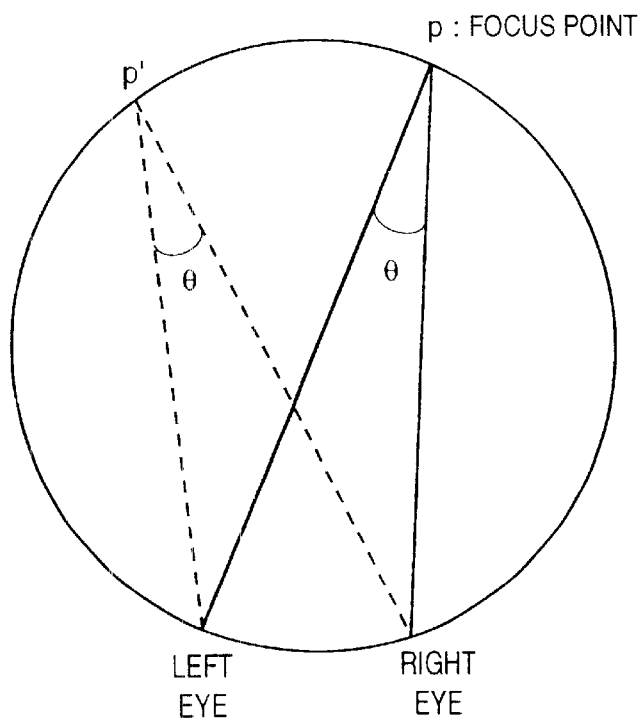
FIG. 24 is a geometrical representation for explaining Holopter circle.

Next, a flowchart showing image generating and displaying processing according to the ninth embodiment is shown in FIG. 22. In the flowchart of the ninth embodiment, step S2201 is added to the flowchart in FIG. 4 of the first embodiment. Regarding detailed processes in the ninth embodiment, all the steps but the added step S2201 are the same as those in one of the first to sixth embodiments, thus detail of process at step S2201 will be explained. In the ninth embodiment, three methods for adjusting a value of a visual acuity factor α at step S2201 are suggested. At step S2201, a value α of the visual acuity factor is adjusted by taking factors which affects recognition characteristics of the viewer into consideration.

As the factors to be considered, there is a characteristic of eye sight of human that a central area of the range of vision looks clear, whereas an area which is far from the central area looks unclear to human's eyes. In order to introduce this characteristic into image processing, a value of the visual acuity factor is controlled to decrease as an angle between a line-of-sight direction and a direction from a position of eye to a unit figure increases.

Second, there is a phenomenon in which, when an angle between a line-of-sight direction and a direction from a position of eye to a unit figure changes with respect to time, eye sight drops. Such eye sight is called "kinetic vision". This phenomenon is often observed when an object is moving, an object is rotating, and a line-of-sight direction is changing. In order to introduce this phenomenon into image processing, a value of the visual acuity factor α which is calculated at step S408 is controlled to decrease as change of an angle between a line-of-sight direction and a direction from a position of eye to a unit figure increases with respect to time.

At step S2201, the visual acuity factor α is multiplied by a coefficient between 0 and 1 so as to introduce the drop of eye sight, thereby simplifying image generation process followed by reducing calculation load. According to the ninth embodiment, it is possible to keep parts of stereo images, which may be recognized by the viewer, high quality and to satisfy real-time response.

Further, there is another situation in which real-time response to a communication operation has priority over image quality when the viewer is performing communication operation via the input device 2001. In this case, at step S2201, by lowering the value of the visual acuity factor during communication operation, the image generating process is simplified, thereby improving real-time response.

Furthermore, it is possible to add the communication operation input device 2001 to the seventh or eighth embodiment, and add step S2201, thereby obtaining the same advantage of the seventh or eighth embodiment as well as advantage of the ninth embodiment.

According to the present invention as described above, by detecting a focus point of a viewer as well as making effective use of characteristics of human sight, it is possible to generate parts of stereo images which are inside of a fusional area where high resolution is required in high precision. On the contrary, to generate parts of stereo images which are outside of the fusional area where high precision is not required, a method which requires light calculation load can be used. Accordingly, it is possible to display stereo images of better quality which are processed at high speed at real time.

The present invention can be applied to a system constituted by a plurality of devices or to an apparatus comprising a single device.

Furthermore, the invention is applicable also to a case where the invention is embodied by supplying a program to a system or apparatus. In this case, a storage medium, storing a program according to the invention, constitutes the invention. The system or apparatus installed with the program read from the medium realized the functions according to the invention.

As many apparently widely different embodiments of the present invention can be made without departing from the spirit and scope thereof, it is to be understood that the invention is not limited to the specific embodiments thereof except as defined in the appended claims.

What is claimed is:

1. A method for generating stereo images from figure data of objects, the method comprising:

a first determination step of determining whether or not an object image to be rendered in the stereo images is in a Panum's fusional area in line-of-sight directions of right and left eyes; and a generating step generating stereo images of the object image based on the figure data using a first image generating method in a case where the object image is inside of the Panum's fusional area, and using a second image generating method for generating the object image in a lower resolution than the first image generating method in a case where the object image is not outside of the Panum's fusional area.

2. The method according to claim 1, wherein the specific area is a Panum's fusional area.

3. The method according to claim 1, wherein said first image generating method is either a ray-tracing algorithm, or a surface representation, or a Phong shading.

4. The method according to claim 1, wherein said second image generating method is either a scan-line algorithm, or a wire frame representation, or a Gouraud shading, or a flat shading.

5. The method according to claim 1, wherein, in said first image generating method, texture mapping is performed, and in said second image generating method, texture mapping is not performed.

6. The method according to claim 1, wherein both said first and second image generating methods are a ray-tracing algorithm, and a maximum number of times of reflection tracing in said first image generating method is set larger than a maximum number of times of reflection tracing in said second image generating method.

7. The method according to claim 1, wherein, when the object to be rendered in the stereo images is translucent, it is rendered as a translucent image on the basis of the figure data of the object in the first image generating method, and it is rendered as an opaque image on the basis of the figure data of the object in the second image generating method.

8. A method for generating stereo images from figure data of objects and displaying the generated stereo images, the method comprising:

a first determination step of determining whether or not an object image to be rendered in the stereo images is in a Panum's fusional area in line-of-sight- directions of right and left eyes;

a generating step of generating stereo images of the object image based on the figure data using a first image generating method in a case where the object image is inside of the specific area, and using a second image generating method for generating the object image in lower resolution than the first image generating method in a case where the object image is outside of the Panum's fusional area; and a display step of displaying the stereo images generated at said generating step.

9. The method according to claim 8, wherein said first determination step comprising:

a first detecting step of detecting positions of eyes of the viewer;

a second determination step of determining a convergence angle of the eyes of the viewer;

a third determination step of determining an angle made between directions from a position of the object to be rendered in the stereo images to the positions of the eyes detected at said first detecting step; and a fourth determination step of determining whether or not the object is inside of the fusional area of the viewer on the basis of the convergence angle determined at said second determination step and the angle determined at said third determination step.

10. The method according to claim 9, wherein said first detecting step comprising the steps of:

finding coordinate values of positions of the right and left eyes in an arbitrary first coordinate system;

detecting an origin of the first coordinate system and head posture of the viewer in a second coordinate system which defines a position and direction of a display unit;

obtaining positions of the right and left eyes in the second coordinate system by adding coordinate values of an origin of the first coordinate system in the second coordinate system to the coordinate values of the positions of right and left eyes in the first coordinate system;

finding relationship between the second coordinate system and a third coordinate system which defines the figure data of the objects to be rendered in the stereo images; and obtaining positions of the right and left eyes in the third coordinate system by applying the obtained relationship to the coordinate values of the positions of the right and left eyes in the second coordinate system.

11. The method according to claim 9, wherein said second determination step comprising the steps of:

determining line-of-sight directions of the right and left eyes of the viewer; and determining an angle made between the line-of-sight directions as the convergence angle.

12. A method for generating stereo images from figure data of objects and displaying the generated stereo images, the method comprising:

an operation step of obtaining a visual resolution factor determined by eye characteristics of right and left eyes of a viewer for the figure data of each object on the basis that whether or not an object image to be rendered is in a Panum's fusional area in line-of-sight directions of the right and left eyes of the viewer;

a generating step of generating stereo images of first and second objects by applying different image generating methods to the first and second object whose visual resolution factor, obtained at said operation step, is different from each other; and a displaying step of displaying the stereo images generated at said generating step.

13. The method according to claim 12, wherein, at said displaying step, a cross shapes, a point, a character, or a mark is displayed over each of the stereo images for right and left eyes on a display screen at an intersection between a line-of-sight of right eye and the display screen and at an intersection between a line-of-sight of left eye and the display screen.

14. a method for generating stereo images from figure data of objects and displaying the generated stereo images, the method comprising:

an operation step of obtaining a visual resolution factor determined on the basis that whether or not an object image to be rendered is in a Panum's fusional area in line-of-sight directions of the right and left eyes of the viewer;

a generating step of generating stereo images of first and second objects of said plurality of objects by using a first set of processing parameters in an image generating method to be applied to the first object and using a second set of processing parameters in the image processing method to be applied to the second object whose visual resolution factor, obtained at said operation step, is different from that of the first object; and a displaying step of displaying the stereo images generated at said generating step.

15. A method for generating stereo images from figure data of objects and displaying the generated stereo images, the method comprising:

an operation step of obtaining a visual acuity factor on the basis that whether or not an object image to be rendered is in a Panum's fusional area in line-of-sight directions of the right and left eyes of the viewer;

a determination step of determining a required precision for each object to be rendered in stereo images on the basis of visual acuity factor obtained at said operation step;

a generating step of generating stereo images of the objects by changing parameters for an image generating method to be applied to figure data of each object on the basis of the required precision determined at said determining step; and a displaying step of displaying the stereo image generated at said generating step.

16. A method for generating stereo images from figure data of objects and displaying the generated stereo images, the method comprising:

an operation step of obtaining a visual acuity factor on the basis that whether or not an object image to be rendered is in a Panum's fusional area in line-of-sight directions of the right and left eyes of the viewer;

a detection step of detecting observing manner of the viewer to watch a display screen on which stereo images are displayed;

a generating step of generating stereo images of the objects by using an image processing method and a resolution determined on the basis of the manner of the viewer detected at said detecting step; and a displaying step of displaying the stereo image generated at said generating step.

17. The method according to claim 16, wherein the observing manner is determined on the basis of a difference between a line-of-sight direction of either right or left eye of the viewer and a direction connecting an object and a position of either right or left eye of the viewer.

18. The method according to claim 16, wherein said observing manner is determined on the basis of moving speed of an object with respect to the viewer's eyes.

19. The method according to claim 16, wherein said observing manner is determined on the basis of required speed of response to display images on a display screen.

20. A method for generating stereo images from figure data of objects and displaying the generated stereo images, the method comprising:

a first detecting step of detecting positions of eyes of a viewer;

a first determination step of determining a convergence angle of the eyes of the viewer;

a second determination step of determining an angle made between directions from a position of the object to be rendered in the stereo images to the positions of the eyes detected at said first detecting step;

a calculation step of obtaining an absolute value of a difference between the convergence angle determined at said first determination step and the angle determined at said second determination step;

a first decision step of deciding a visual acuity factor for each object on the basis of the absolute value calculated at said calculation step;

a second decision step of deciding an image processing method and parameters to be applied to figure data of each object on the basis of the visual acuity factor decided at said first decision step;

a generating step of generating stereo images by using the image processing method and parameters decided at said second decision step; and a displaying step of displaying the stereo images generated at said generating step.

21. The method according to claim 20, wherein said first detecting step comprising steps of:

finding coordinate values of positions of the right and left eyes in an arbitrary first coordinate system;

detecting an origin of the first coordinate system and head posture of the viewer in a second coordinate system which defines a position and direction of a display unit;

obtaining positions of the right and left eyes in the second coordinate system by adding coordinate values of an origin of the first coordinate system in the second coordinate system to the coordinate values of the positions of right and left eyes in the first coordinate system;

finding relationship between the second coordinate system and a third coordinate system which defines the figure data of the objects to be rendered in the stereo images; and obtaining positions of the right and left eyes in the third coordinate system by applying the obtained relationship to the coordinate values of the positions of the right and left eyes in the second coordinate system.

22. The method according to claim 20, wherein said first determination step comprising the steps of:

determining line-of-sight directions of the right and left eyes of the viewer; and determining an angle made between the line-of-sight directions as the convergence angle.

23. A method for generating stereo images from figure data of objects and displaying the generated stereo images, the method comprising the steps of:

detecting a position and a line-of-sight direction of leading eye of a viewer;

determining a position and line-of-sight direction of the other eye of the viewer on the basis of the position and the line-of-sight direction of the leading eye detected at said detecting step;

deciding a visual acuity factor which is determined by eye characteristics for each object on the basis of the positions and the line-of-sight directions;

deciding required precision for each object on the basis of the visual acuity factor;

generating stereo images by changing parameters of an image processing method to be applied to each object on the basis of the required precision decided at said deciding step; and displaying the stereo images generated at said generating step.

24. A method for generating stereo images from figure data of objects and displaying the generated stereo images, the method comprising the steps of:

detecting posture of viewer's head;

determining positions and line-of-sight directions of right and left eyes of a viewer on the basis of the posture of the viewer's head detected at said detecting step;

deciding a visual acuity factor which is determined by eye characteristics for each object on the basis of the positions and the line-of-sight directions;

deciding required precision for each object on the basis of the visual acuity factor;

generating stereo images by changing parameters of an image processing method to be applied to each object on the basis of the required precision decided at said deciding step; and displaying the stereo images generated at said generating step.

25. A stereo image generating and displaying apparatus for generating stereo images from figure data of objects, the apparatus comprising:

first determination means for determining whether or not an object image to be rendered in the stereo images is in a Panum's fusional area in line-of-sight directions of right and left eyes; and first generating means for generating stereo images of the object image based on the figure data using a first image generating method in a case where the object image is inside of the Panum's fusional area, and second generating means for generating stereo images of the object image based on the figure data using a second image generating method for generating the object image in a lower resolution than the first image generating method in a case where the object image is outside of the Panum's fusional area.

26. The apparatus according to claim 25, wherein the specific area is a Panum's fusional area except the gaze point.

27. The apparatus according to claim 25, wherein said first image generating method is either a ray-tracing algorithm, or a surface representation, or a Phong shading.

28. The apparatus according to claim 25, wherein said second image generating method is either a scan-line algorithm, or a wire frame representation, or a Gouraud shading, or a flat shading.

29. The apparatus according to claim 25, wherein, in said first image generating method, texture mapping is performed, and in said second image generating method, texture mapping is not performed.

30. The apparatus according to claim 25, wherein both said first and second image generating methods are a ray-tracing algorithm, and a maximum number of times of reflection tracing in said first image generating method is set larger than a maximum number of times of reflection tracing in said second image generating method.

31. The apparatus according to claim 25, wherein, when the object to be rendered in the stereo images is translucent, it is rendered as a translucent image on the basis of the figure data of the object in the first image generating method, and it is rendered as an opaque image on the basis of the figure data of the object in the second image generating method.

32. A stereo image generating and displaying apparatus for generating stereo images from figure data of objects and displaying the generated stereo images, the apparatus comprising:

first determination means for determining whether or not an object image to be rendered in the stereo images is in a Panum's fusional area in line-of-sight directions of right and left eyes;

first generating means for generating stereo images of the object image based on the figure data using a first image generating method in a case where the object image is inside of the Panum's fusional area, and second generating means for generating stereo images of the object image based on the figure data using a second image generating method for generating the object image in a lower resolution than the first image generating method when the object image is outside of the Panum's fusional area; and displaying means for displaying the stereo images generated by said generating means.

33. The apparatus according to claim 32, wherein said first determination means comprising:

first detecting means for detecting positions of eyes of the viewer;

second determination means for determining a convergence angle of the eyes of the viewer;

third determination means for determining an angle made between directions from a position of the object to be rendered in the stereo images to the positions of the eyes detected by said first detecting means; and fourth determination means for determining whether or not the object is inside of the fusional area of the viewer on the basis of the convergence angle determined by said second determination means and the angle determined by said third determination means.

34. The apparatus according to claim 33, wherein said first detecting means comprising:

operation means for finding coordinate values of positions of the right and left eyes in an arbitrary first coordinate system;

second detecting means for detecting an origin of the first coordinate system and head posture of the viewer in a second coordinate system which defines a position and direction of a display unit;

fifth determination means for obtaining positions of the right and left eyes in the second coordinate system by adding coordinate values of an origin of the first coordinate system in the second coordinate system to the coordinate values of the positions of right and left eyes in the first coordinate system;

sixth determination means for finding relationship between the second coordinate system and a third coordinate system which defines the figure data of the objects to be rendered in the stereo images; and seventh determination means for obtaining positions of the right and left eyes in the third coordinate system by applying the obtained relationship to the coordinate values of the positions of the right and left eyes in the second coordinate system.

35. The apparatus according to claim 33, wherein said second determination means comprising:

eighth determination means for determining line-of-sight directions of the right and left eyes of the viewer; and ninth determination means for determining an angle made between the line-of-sight directions as the convergence angle.

36. A stereo image generating and displaying apparatus for generating stereo images from figure data of objects and displaying the generated stereo images, the apparatus comprising:

operation means for obtaining a visual resolution factor determined on the basis that whether or not an object image to be rendered is in a Panum's fusional area in line-of-sight directions of the right and left eyes of the viewer;

generating means for generating stereo images of first and second objects by applying different image generating methods to the first and second objects whose visual resolution factor, obtained by said operation means, is different from each other; and displaying means for displaying the stereo images generated by said generating means.

37. The apparatus according to claim 36, wherein said displaying means displays a cross shapes, a point, a character, or a mark over each of the stereo images for right and left eyes on a display screen at an intersection between a line-of-sight of right eye and the display screen and at an intersection between a line-of-sight of left eye and the display screen.

38. A stereo image generating and displaying apparatus for generating stereo images from figure data of objects and displaying the generated stereo images, the apparatus comprising:

operation means for obtaining a visual resolution factor determined on the basis that whether or not an object image to be rendered is in a Panum's fusional area in line-of-sight directions of the right and left eyes of the viewer;

generating means for generating stereo images of first and second objects of said plurality of objects by using a first set of processing parameters in an image generating method to be applied to the first object and using a second set of processing parameters in the image processing method to be applied to the second object whose visual resolution factor, obtained by said operation means, is different from that of the first object; and displaying means for displaying the stereo images generated by said generating means.

39. A stereo image generating and displaying apparatus for generating stereo images from figure data of objects and displaying the generated stereo images, the apparatus comprising:

operation means for obtaining a visual acuity factor on the basis that whether or not an object image to be rendered is in a Panum's fusional area in line-of-sight directions of the right and left eyes of the viewer;

determination means for determining a required precision for each object to be rendered in stereo image on the basis of the visual acuity factor obtained by said operation means;

generating means for generating stereo images of the objects by changing parameters for an image generating method to be applied to figure data of each object on the basis of the required precision determined by said determination means; and displaying means for displaying the stereo images generated by said generating means.

40. A stereo image generating and displaying apparatus for generating stereo images from figure data of objects and displaying the generated stereo images, the apparatus comprising:

operation means for obtaining a visual factor on the basis that whether or not an object image to be rendered is in a Panum's fusional area in line-of-sight directions of the right and left eyes of the viewer;

detecting means for detecting observing manner of the viewer to watch a display screen on which stereo images are displayed;

generating means for generating stereo images of the objects by using an image processing method and a resolution determined on the basis of the manner of the viewer detected by said detecting means; and displaying means for displaying stereo images generated by said generating means.

41. The apparatus according to claim 40, wherein the observing manner is determined on the basis of a difference between a line-of-sight direction of either right or left eye of the viewer and a direction connecting an object and a position of either right or left eye of the viewer.

42. The apparatus according to claim 40, wherein said observing manner is determined on the basis of moving speed of an object with respect to the viewer's eyes.

43. The apparatus according to claim 40, wherein said observing manner is determined on the basis of required speed of response to display images on a display screen.

44. A stereo image generating and displaying apparatus for generating stereo images from figure data of objects and displaying the generated stereo images, the apparatus comprising:

first detecting means for detecting positions of eyes of a viewer;

first determination means for determining a convergence angle of the eyes of the viewer;

second determination means for determining an angle made between directions from a position of the object to be rendered in the stereo images to the positions of the eyes detected by said first detecting means;

first calculation means for obtaining an absolute value of a difference between the convergence angle determined by said first determination means and the angle determined by said second determination means;

first decision means for deciding a visual acuity factor for each object on the basis of the absolute value calculated by said first calculation means;

second decision means for deciding an image processing method and parameters to be applied to figure data of each object on the basis of the visual acuity factor decided by said first decision means;

generating means for generating stereo images by using the image processing method and parameters decided by said second decision means; and displaying means for displaying the stereo images generated by said generating means.

45. The apparatus according to claim 44, wherein said first detecting means comprising:

third determination means for finding coordinate values of positions of the right and left eyes in an arbitrary first coordinate system;

second detecting means for detecting an origin of the first coordinate system and head posture of the viewer in a second coordinate system which defines a position and direction of a display unit;

second calculation means for obtaining positions of the right and left eyes in the second coordinate system by adding coordinate values of an origin of the first coordinate system in the second coordinate system to the coordinate values of the positions of right and left eyes in the first coordinate system;

finding relationship between the second coordinate system and a third coordinate system which defines the figure data of the objects to be rendered in the stereo images; and fourth determination means for obtaining positions of the right and left eyes in the third coordinate system by applying the obtained relationship to the coordinate values of the positions of the right and left eyes in the second coordinate system.

46. The apparatus according to claim 44, wherein said first determination means comprising:

fifth determination means for determining line-of-sight directions of the right and left eyes of the viewer; and sixth determination means for determining an angle made between the line-of-sight directions as the convergence angle.

47. A stereo image generating and displaying apparatus for generating stereo images from figure data of objects and displaying the generated stereo images, the apparatus comprising:

detecting means for detecting a position and a line-of-sight direction of leading eye of a viewer;

determining means for determining a position and a line-of-sight direction of the other eye of the viewer on the basis of the position and the line-of-sight direction of the leading eye detected by said detecting means;

first deciding means for deciding a visual acuity factor which is determined by eye characteristics for each object on the basis of the positions and the line-of-sight directions;

second deciding means deciding required precision for each object on the basis of the visual acuity factor;

generating means for generating stereo images by changing parameters of an image processing method to be applied to each object on the basis of the required precision decided by said second deciding means; and displaying means for displaying the stereo images generated by said generating means.

48. A stereo image generating and displaying apparatus for generating stereo images from figure data of objects and displaying the generated stereo images, the apparatus comprising:

detecting means for detecting posture of viewer's head;

determining means for determining a position and line-of-sight directions of right and left eyes of a viewer on the basis of the posture of the viewer's head detected by said detecting means;

first deciding means for deciding a visual acuity factor which is determined by eye characteristics for each object on the basis of the positions and the line-of-sight directions;

second deciding means deciding required precision for each object on the basis of the visual acuity factor;

generating means for generating stereo images by changing parameters of an image processing method to be applied to each object on the basis of the required precision decided by said second deciding means; and displaying means for displaying the stereo images generated by said generating means.

* * * * *

UNITED STATES PATENT AND TRADEMARK OFFICE
CERTIFICATE OF CORRECTION

PATENT NO. : 6,414,681 B1
DATED : July 2, 2002
INVENTOR(S) : Toshikazu Ohshima et al.

It is certified that error appears in the above-identified patent and that said Letters Patent is hereby corrected as shown below:

Title page, Item [54] and Column 1, lines 1-2,
The title should read as follows:
-- METHOD AND APPARATUS FOR GENERATING STEREO IMAGES FROM FIGURE DATA OF OBJECTS --

Column 18,
Line 12, "factor which is determined" should read -- factor determined --
Lines 31-32, delete "which is determined by eye characteristics for each object"
Line 34, "required precision for" should read -- required precision of rendering of the images for --

Column 22,
Lines 42-43, "line-of-sight direction of" should read -- line-of-sight of --
Lines 50-51, delete "which is determined by eye characteristics for each object"
Line 53, "required precision for" should read -- required precision of a rendering operation of the images for --
Line 66, "determining a position and" should read -- determining positions and --

Column 23,
Lines 4-5, delete "which is determined by eye characteristics for each object"
Lines 7-8, "second deciding means deciding required precision for each object on the basis of the visual acuity factor;" should read -- second deciding means for deciding required precision of a rendering operation for each object on the basis of the visual acuity factor; --

UNITED STATES PATENT AND TRADEMARK OFFICE
CERTIFICATE OF CORRECTION

PATENT NO.    : 6,414,681 B1
DATED         : July 2, 2002
INVENTOR(S)   : Toshikazu Ohshima et al.

It is certified that error appears in the above-identified patent and that said Letters Patent is hereby corrected as shown below:

Column 24,
Line 4, "decided by said" should read -- decided at said --

Signed and Sealed this

Twenty-fourth Day of December, 2002

JAMES E. ROGAN
*Director of the United States Patent and Trademark Office*